US012684491B2

(12) United States Patent
Zhang et al.

(10) Patent No.: US 12,684,491 B2
(45) Date of Patent: Jul. 14, 2026

(54) METHOD AND APPARATUS FOR DETERMINING TRANSMIT POWER

(71) Applicant: Huawei Technologies Co., Ltd., Shenzhen (CN)

(72) Inventors: Lili Zhang, Beijing (CN); Xizeng Dai, Beijing (CN); Jianghua Liu, Beijing (CN); Zheng Yu, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 478 days.

(21) Appl. No.: 18/161,448

(22) Filed: Jan. 30, 2023

(65) Prior Publication Data

US 2023/0180137 A1     Jun. 8, 2023

Related U.S. Application Data

(63) Continuation of application No. PCT/CN2021/108694, filed on Jul. 27, 2021.

(30) Foreign Application Priority Data

Jul. 28, 2020    (CN) .......................... 202010739728.1

(51) Int. Cl.
*H04W 52/14*        (2009.01)
*H04W 52/24*        (2009.01)

(52) U.S. Cl.
CPC ....... *H04W 52/146* (2013.01); *H04W 52/241* (2013.01); *H04W 52/242* (2013.01)

(58) Field of Classification Search
CPC ............. H04W 52/146; H04W 52/241; H04W 52/242; H04W 52/245; H04W 52/246; H04W 52/247
See application file for complete search history.

(56) References Cited

U.S. PATENT DOCUMENTS

| | | | | |
|---|---|---|---|---|
| 10,721,693 B2 * | 7/2020 | Malladi | .............. | H04W 52/242 |
| 2007/0274372 A1 * | 11/2007 | Asai | ........................ | H04B 1/525 |
| | | | | 375/130 |
| 2014/0133448 A1 * | 5/2014 | Xu | ........................ | H04L 5/0073 |
| | | | | 370/329 |

FOREIGN PATENT DOCUMENTS

| | | |
|---|---|---|
| CN | 108811063 A | 11/2018 |
| CN | 110769491 A | 2/2020 |

(Continued)

OTHER PUBLICATIONS

Huawei et al: ("Discussion on the UL power control for LTE-NR uplink coexistence", 3GPP Draft; R1-1715479, 3rd Generation Partnership Project (3GPP), vol. RAN WG1, No. Nagoya, Japan; Sep. 18, 2017-Sep. 21, 2017 Sep. 17, 2017 (Sep. 17, 2017), XP051338947. (Year: 2017).*

(Continued)

*Primary Examiner* — John J Lee
(74) *Attorney, Agent, or Firm* — Conley Rose, P.C.

(57)        ABSTRACT

A method and an apparatus for determining transmit power, where a first network device obtains first information corresponding to a first carrier, where the first information includes at least one of a path loss, a range of the path loss, signal strength, a range of the signal strength, a channel quality state, or a range of the channel quality state; and where the first network device sends the first information to a terminal device. The terminal device determines uplink transmit power on the first carrier based on the first information. In this way, the uplink transmit power on the first carrier is accurately controlled, communication reliability is improved, and power consumption of the terminal device is reduced.

17 Claims, 6 Drawing Sheets

(56) References Cited

FOREIGN PATENT DOCUMENTS

WO     WO-2007091590 A1 *   8/2007   ...........  H04L 5/0007
WO          2013023337 A1      2/2013

OTHER PUBLICATIONS

R1-1715479, "Discussion on the UL power control for LTE-NR uplink coexistence," 3GPP TSG RAN WG1 Meeting AH NR#3, Nagoya, Japan, Sep. 18-21, 2017, 5 pages.

* cited by examiner

Cell Cell#A@700MHz

Cell Cell#B@4.9GHz

201

First network device

202

Second network device

203

Terminal device

METHOD AND APPARATUS FOR DETERMINING TRANSMIT POWER

CROSS-REFERENCE TO RELATED APPLICATIONS

This application is a continuation of International Patent Application No. PCT/CN2021/108694, filed on Jul. 27, 2021, which claims priority to Chinese Patent Application No. 202010739728.1, filed on Jul. 28, 2020. The disclosures of the aforementioned applications are hereby incorporated by reference in their entireties.

TECHNICAL FIELD

This application relates to the field of communication technologies, and in particular, to a method and an apparatus for determining transmit power.

BACKGROUND

In a 5th generation (5G) new radio (NR) communication system, uplink transmit power of a terminal device is usually limited. As a result, received signal strength of the uplink transmission signal may be insufficient to ensure coverage performance of the uplink transmission signal when it arrives at a base station. In addition, uplink spectrum may also be insufficient, and therefore it is impossible to rely on data retransmission to ensure uplink coverage performance. Currently, supplementary uplink (SUL) is introduced to the NR communication system as an alternative when uplink coverage in the NR communication system is insufficient. In other words, the NR communication system supports configuration of a plurality of uplink carriers in one cell. A low frequency band of a Long-Term Evolution (LTE) communication system usually has better coverage performance. Therefore, a low frequency band (for example, 700 megahertz (MHz), 1.8 gigahertz (GHz), or 2.1 GHz) of the LTE communication system is used to perform NR uplink transmission, to implement SUL. For example, when a terminal device performs NR uplink transmission using a frequency band of the LTE communication system, the terminal device may multiplex the frequency band with uplink time-division duplex (TDD) or frequency-division duplex (FDD) in the LTE communication system.

In addition, a high frequency band may be used to implement SUL. For example, a 4.9 GHz frequency band can provide a spectrum resource with a higher bandwidth, to provide a more sufficient uplink resource. Therefore, uplink coverage may be expanded on the frequency band.

When a low frequency band of the LTE communication system is used to implement SUL, the terminal device may detect signal quality on a frequency band of the NR communication system. When the signal quality on the frequency band is lower than a preset threshold, the terminal device determines that the frequency band cannot meet an access requirement of the terminal device. Therefore, the terminal device may access the low frequency band of the LTE communication system. However, for a high frequency band, for example, the 4.9 GHz frequency band, when signal quality on a frequency band of the NR communication system is unsatisfactory, switching to the high frequency band cannot ensure that signal strength is always good. Therefore, a current SUL access rule is not applicable to a case in which the high frequency band is used to implement SUL, and a new access mechanism needs to be designed. A macro base station configures, for the terminal device, a resource of an uplink signal used for uplink measurement/carrier selection. However, sending of the uplink signal configured for the foregoing purpose also needs to be controlled, to improve communication reliability and reduce power consumption of the terminal device.

In a current power control solution, a terminal device determines transmit power of the terminal device according to a predefined formula. In the power control solution, some parameters are obtained from a network device. However, carriers on the 4.9 GHz spectrum are all-uplink carriers or uplink-dominant carriers. As a result, it is difficult for the terminal device to obtain the foregoing parameters Therefore, how to control transmit power of an uplink signal used for uplink measurement/carrier selection needs to be urgently resolved.

SUMMARY

This application provides a method and an apparatus for determining transmit power, to effectively control transmit power of an uplink signal, improve communication reliability, and reduce power consumption of a terminal device.

According to a first aspect, a method for determining transmit power is provided. The method includes: A terminal device receives first information, where the first information indicates at least one of a path loss, a range of the path loss, signal strength, a range of the signal strength, a channel quality state, and a range of the channel quality state; and the terminal device determines uplink transmit power on the first carrier based on the first information. In this aspect, the terminal device may accurately determine the uplink transmit power on the first carrier based on the first information sent by a first network device. In this way, the uplink transmit power on the first carrier is accurately controlled, communication reliability is improved, and power consumption of the terminal device is reduced.

With reference to the first aspect, in a possible implementation, before the terminal device receives the first information, the method further includes: The terminal device sends a first uplink signal to a first network device on the first carrier; or the terminal device sends the first uplink signal to the first network device on a second carrier, and the second carrier and the first carrier belong to one carrier group. In this implementation, the first uplink signal may be sent using a similar attribute between carriers to perform uplink measurement.

With reference to the first aspect, in still another possible implementation, that the terminal device sends a first uplink signal to a first network device on the first carrier includes: The terminal device sends, on the first carrier, the first uplink signal to the first network device at a first power value, where the first power value is included in the first uplink signal, the first power value is preconfigured, or there is an association relationship between a transmission configuration of the first uplink signal and the first power value. In this implementation, the first network device may be explicitly or implicitly notified of a transmit power value used by the terminal device to send the first uplink signal, such that the first network device calculates the path loss.

With reference to the first aspect, in still another possible implementation, the path loss is a path loss corresponding to the first carrier or a first carrier group.

With reference to the first aspect, in still another possible implementation, the range of the path loss is a range of the path loss corresponding to the first carrier or the first carrier group.

With reference to the first aspect, in still another possible implementation, the signal strength is signal strength corresponding to the first carrier or the first carrier group.

With reference to the first aspect, in still another possible implementation, the range of the signal strength is a range of the signal strength corresponding to the first carrier or the first carrier group.

With reference to the first aspect, in still another possible implementation, the signal quality state is a signal quality state corresponding to the first carrier or the first carrier group.

With reference to the first aspect, in still another possible implementation, the range of the signal quality state is a range of the signal quality state corresponding to the first carrier or the first carrier group.

With reference to the first aspect, in still another possible implementation, the first carrier is an uplink carrier or a carrier whose uplink slot configuration dominates in a slot configuration, and the first carrier is a carrier in the first carrier group.

With reference to the first aspect, in still another possible implementation, that the terminal device receives the first information includes: The terminal device receives the first information from a second network device; and the terminal device receives the first information from the first network device within a first slot, where the first slot is a downlink slot configured by the first network device for the terminal device. In this implementation, when the first carrier is an all-uplink carrier, the terminal device may receive the first information from the second network device; or when the first carrier is an uplink-dominant carrier, the terminal device may receive the first information from the first network device within a small quantity of downlink slots.

With reference to the first aspect, in still another possible implementation, the first information is carried in a random access response message or system information. In this implementation, the first uplink signal may be used both for random access and uplink measurement. Therefore, the first information is carried in the random access response message or the system information.

With reference to the first aspect, in still another possible implementation, the method further includes: The terminal device obtains at least one of a target power value and a path loss compensation factor that are corresponding to the first carrier, where the target power value and the path loss compensation factor that are corresponding to the first carrier are configured by the first network device or the second network device for the terminal device using radio resource control signaling; and the terminal device determines the uplink transmit power based on at least one of the first information, and the target power value and the path loss compensation factor that are corresponding to the first carrier.

With reference to the first aspect, in still another possible implementation, that the target power value and the path loss compensation factor that are corresponding to the first carrier are configured by the second network device for the terminal device using radio resource control signaling includes: The target power value and the path loss compensation factor that are corresponding to the first carrier are a first uplink signal configured by the second network device for the terminal device using the radio resource control signaling, and a first uplink signal of the terminal device is the first uplink signal sent by the terminal device to the first network device.

With reference to the first aspect, in still another possible implementation, the method further includes: The terminal device obtains configuration information of the first uplink signal, where the configuration information is specific to the first carrier on a first spectrum, the configuration information is specific to the first carrier group on a first spectrum, the configuration information is specific to the first carrier on a first spectrum and the first network device, or the configuration information is specific to the first carrier group on a first spectrum and the first network device.

According to a second aspect, a method for determining transmit power is provided. The method includes: A first network device obtains first information, where the first information includes at least one of a path loss, a range of the path loss, signal strength, a range of the signal strength, a channel quality state, and a range of the channel quality state; and the first network device sends the first information.

With reference to the second aspect, in a possible implementation, the method further includes: The first network device receives a first uplink signal from a terminal device on a first carrier; or the first network device receives the first uplink signal from the terminal device on a second carrier, and the second carrier and the first carrier belong to one carrier group; and that a first network device obtains first information corresponding to a first carrier includes: The first network device determines the first information based on the first uplink signal.

With reference to the second aspect, in still another possible implementation, that the first network device receives a first uplink signal from a terminal device on a first carrier includes: The first network device receives, on the first carrier, the first uplink signal sent by the terminal device at a first power value, where the first power value is included in the first uplink signal, the first power value is preconfigured, or there is an association relationship between a transmission configuration of the first uplink signal and the first power value.

With reference to the second aspect, in still another possible implementation, the path loss is a path loss corresponding to the first carrier or a first carrier group.

With reference to the second aspect, in still another possible implementation, the range of the path loss is a range of the path loss corresponding to the first carrier or the first carrier group.

With reference to the second aspect, in still another possible implementation, the signal strength is signal strength corresponding to the first carrier or the first carrier group.

With reference to the second aspect, in still another possible implementation, the range of the signal strength is a range of the signal strength corresponding to the first carrier or the first carrier group.

With reference to the second aspect, in still another possible implementation, the signal quality state is a signal quality state corresponding to the first carrier or the first carrier group.

With reference to the second aspect, in still another possible implementation, the range of the signal quality state is a range of the signal quality state corresponding to the first carrier or the first carrier group.

With reference to the second aspect, in still another possible implementation, the first carrier is an uplink carrier or a carrier whose uplink slot configuration dominates in a slot configuration, and the first carrier is a carrier in the first carrier group.

With reference to the second aspect, in still another possible implementation, that the first network device sends the first information includes: The first network device sends first indication information to a second network device, where the first indication information includes at least one of the path loss, the range of the path loss, the signal strength, the range of the signal strength, the channel quality state, and the range of the channel quality state; or the first network device sends the first information to the terminal device within a first slot, where the first slot is a downlink slot configured by the first network device for the terminal device.

With reference to the second aspect, in still another possible implementation, the first information is carried in a random access response message or system information.

With reference to the second aspect, in still another possible implementation, the method further includes: The first network device sends radio resource control signaling to the terminal device, where the radio resource control signaling includes at least one of a target power value and a path loss compensation factor that are corresponding to the first carrier.

With reference to the second aspect, in still another possible implementation, the method further includes: The first network device sends configuration information of the first uplink signal, where the configuration information is specific to the first carrier on a first spectrum, the configuration information is specific to the first carrier group on a first spectrum, the configuration information is specific to the first carrier on a first spectrum and the first network device, or the configuration information is specific to the first carrier group on a first spectrum and the first network device.

According to a third aspect, a method for determining transmit power is provided. The method includes: A terminal device receives downlink control information, where the downlink control information includes at least one information block, the at least one information block includes at least one piece of the following information: trigger indication information and a closed-loop power control command, and the trigger indication information is used to trigger transmission of a first uplink signal; and the terminal device determines uplink transmit power on a first carrier based on the downlink control information. In this aspect, the terminal device receives the downlink control information sent by a first network device, and can accurately determine the uplink transmit power on the first carrier based on at least one of the trigger indication information and the closed-loop power control command that are included in the downlink control information. Therefore, communication reliability is improved, and power consumption of the terminal device is reduced.

With reference to the third aspect, in a possible implementation, the terminal device obtains a closed-loop power control adjustment state, where the closed-loop power control adjustment state is configured by a second network device for uplink data transmission or uplink signal transmission of the first network device. In this implementation, the second network device additionally sets the closed-loop power control adjustment state for the uplink data transmission or the uplink signal transmission to which the first network device belongs. The terminal device obtains the closed-loop power control adjustment state, and may perform closed-loop power control on the uplink data transmission or the uplink signal transmission between the terminal device and the first network device.

According to a fourth aspect, a method for determining transmit power is provided. The method includes: A second network device sends downlink control information, where the downlink control information includes at least one information block, the at least one information block includes at least one piece of the following information: trigger indication information and a closed-loop power control command, and the trigger indication information is used to trigger transmission of a first uplink signal.

With reference to the fourth aspect, in a possible implementation, the downlink control information includes a closed-loop power control adjustment state, and the method further includes: The second network device sends first information to a first network device, where the first information includes the closed-loop power control adjustment state configured by the second network device for uplink data transmission or uplink signal transmission of the first network device.

According to a fifth aspect, a method for determining transmit power is provided. The method includes: A first network device sends downlink control information within a first slot, where the downlink control information includes at least one information block, the at least one information block includes at least one piece of the following information: trigger indication information and a closed-loop power control command, the trigger indication information is used to trigger transmission of a first uplink signal, and the first slot is a downlink slot in an uplink-dominant slot that is configured by the first network device for a terminal device.

With reference to the fifth aspect, in still another possible implementation, the downlink control information includes a closed-loop power control adjustment state, and the method further includes: The first network device receives first information from a second network device, where the first information includes the closed-loop power control adjustment state configured by the second network device for uplink data transmission or uplink signal transmission of the first network device.

With reference to the third aspect to the fifth aspect, in still another possible implementation, the downlink control information includes the closed-loop power control adjustment state, where the closed-loop power control adjustment state is configured by the second network device for the uplink data transmission or the uplink signal transmission of the first network device.

With reference to the third aspect to the fifth aspect, in still another possible implementation, the closed-loop power control adjustment state is configured for the terminal device using Radio Resource Control (RRC) signaling.

With reference to the third aspect to the fifth aspect, in still another possible implementation, that the closed-loop power control adjustment state is configured for the terminal device using RRC signaling includes: The second network device configures the closed-loop power control adjustment state for the terminal device using the RRC signaling.

With reference to the third aspect to the fifth aspect, in still another possible implementation, the closed-loop power control command corresponds to a closed-loop power control adjustment step that is of the closed-loop power control adjustment state and that is correspondingly configured.

With reference to the third aspect to the fifth aspect, in still another possible implementation, the trigger indication information is first trigger indication information, and the first trigger indication information is used by the second network device to trigger the uplink signal transmission of the first network device.

With reference to the third aspect to the fifth aspect, in still another possible implementation, the trigger indication information included in the downlink control information includes only the first trigger indication information.

With reference to the third aspect to the fifth aspect, in still another possible implementation, the closed-loop power control command included in the downlink control information includes only a closed-loop power control command corresponding to the first trigger indication information.

With reference to the third aspect to the fifth aspect, in still another possible implementation, the downlink control information is scrambled using a first radio network temporary identifier (RNTI).

With reference to the third aspect to the fifth aspect, in still another possible implementation, the trigger indication information includes first trigger indication information and second trigger indication information; the first trigger indication information is used by the second network device to trigger the uplink signal transmission of the first network device; and the second trigger indication information is used by the second network device to trigger uplink signal transmission of the second network device.

With reference to the third aspect to the fifth aspect, in still another possible implementation, an uplink signal or the uplink signal transmission of the second network device includes: an uplink signal sent to the second network device, or an uplink signal that needs to be detected by the second network device.

With reference to the third aspect to the fifth aspect, in still another possible implementation, an uplink signal or the uplink signal transmission of the first network device includes: an uplink signal sent to the first network device, or an uplink signal that needs to be detected by the first network device.

With reference to the third aspect to the fifth aspect, in still another possible implementation, the closed-loop power control command included in the downlink control information includes a closed-loop power control command corresponding to the first trigger indication information and a closed-loop power control command corresponding to the second trigger indication information.

With reference to the third aspect to the fifth aspect, in still another possible implementation, the downlink control information further includes second indication information, and the second indication information is used to indicate that the first uplink signal is used by the first network device to perform uplink measurement.

With reference to the third aspect to the fifth aspect, in still another possible implementation, the terminal device receives the downlink control information from the second network device.

With reference to the third aspect to the fifth aspect, in still another possible implementation, the second indication information indicates to trigger transmission of the first uplink signal once or trigger semi-persistent transmission of the first uplink signal.

With reference to the third aspect to the fifth aspect, in still another possible implementation, the downlink control information further includes third indication information, and the third indication information indicates to trigger transmission of the first uplink signal once or trigger semi-persistent transmission of the first uplink signal; and the first uplink signal is used by the first network device to perform uplink measurement.

According to a sixth aspect, an apparatus for determining transmit power is provided, configured to perform the method in any one of the first aspect or the possible implementations of the first aspect. The apparatus for determining transmit power may be the terminal device in any one of the first aspect or the possible implementations of the first aspect, or a module applied to the terminal device, for example, a chip or a chip system. The apparatus for determining transmit power includes a corresponding module, unit, or means for implementing the foregoing method. The module, unit, or means may be implemented by hardware or software, or may be implemented by hardware executing corresponding software. The hardware or the software includes at least one module or unit corresponding to the foregoing function.

With reference to the sixth aspect, in a possible implementation, the apparatus for determining transmit power includes a transceiver unit and a processing unit. The transceiver unit is configured to receive first information, where the first information indicates at least one of a path loss, a range of the path loss, signal strength, a range of the signal strength, a channel quality state, and a range of the channel quality state; and the processing unit is configured to determine uplink transmit power on a first carrier based on the first information.

Optionally, the transceiver unit is further configured to send a first uplink signal to a first network device on the first carrier; or the transceiver unit is further configured to send the first uplink signal to the first network device on a second carrier, and the second carrier and the first carrier belong to one carrier group.

Optionally, the transceiver unit is further configured to send, on the first carrier, the first uplink signal to the first network device at a first power value, where the first power value is included in the first uplink signal, the first power value is preconfigured, or there is an association relationship between a transmission configuration of the first uplink signal and the first power value.

Optionally, the transceiver unit is further configured to receive the first information from a second network device; or the transceiver unit is further configured to receive the first information from the first network device within a first slot, where the first slot is a downlink slot configured by the first network device for a terminal device.

Optionally, the processing unit is further configured to obtain at least one of a target power value and a path loss compensation factor that are corresponding to the first carrier, where the target power value and the path loss compensation factor that are corresponding to the first carrier are configured by the first network device or the second network device for the terminal device using radio resource control signaling. The processing unit is further configured to determine the uplink transmit power based on at least one of the first information, and the target power value and the path loss compensation factor that are corresponding to the first carrier.

Optionally, the processing unit is further configured to obtain configuration information of the first uplink signal, where the configuration information is specific to the first carrier on a first spectrum, the configuration information is specific to a first carrier group on a first spectrum, the configuration information is specific to the first carrier on a first spectrum and the first network device, or the configuration information is specific to a first carrier group on a first spectrum and the first network device.

With reference to the sixth aspect, in still another possible implementation, the apparatus for determining transmit power includes an input interface, an output interface, and a processing circuit. The input interface is configured to receive first information, where the first information indicates at least one of a path loss, a range of the path loss, signal strength, a range of the signal strength, a channel quality state, and a range of the channel quality state; and the processing circuit is configured to determine uplink transmit power on a first carrier based on the first information.

Optionally, the output interface is configured to send a first uplink signal to a first network device on the first carrier; or the output interface is further configured to send the first uplink signal to the first network device on a second carrier, and the second carrier and the first carrier belong to one carrier group.

Optionally, the output interface is further configured to send, on the first carrier, the first uplink signal to the first network device at a first power value, where the first power value is included in the first uplink signal, the first power value is preconfigured, or there is an association relationship between a transmission configuration of the first uplink signal and the first power value.

Optionally, the input interface is further configured to receive the first information from a second network device; or the input interface is further configured to receive the first information from the first network device within a first slot, where the first slot is a downlink slot configured by the first network device for a terminal device.

Optionally, the processing circuit is further configured to obtain at least one of a target power value and a path loss compensation factor that are corresponding to the first carrier, where the target power value and the path loss compensation factor that are corresponding to the first carrier are configured by the first network device or the second network device for the terminal device using radio resource control signaling. The processing circuit is further configured to determine the uplink transmit power based on at least one of the first information, and the target power value and the path loss compensation factor that are corresponding to the first carrier.

Optionally, the processing circuit is further configured to obtain configuration information of the first uplink signal, where the configuration information is specific to the first carrier on a first spectrum, the configuration information is specific to a first carrier group on a first spectrum, the configuration information is specific to the first carrier on a first spectrum and the first network device, or the configuration information is specific to a first carrier group on a first spectrum and the first network device.

For example, the apparatus for determining transmit power further includes a memory, the memory is coupled to at least one processor, and the at least one processor is configured to run program instructions stored in the memory, to enable the apparatus for determining transmit power to perform the method in any one of the first aspect or the possible implementations of the first aspect.

In a possible implementation, the memory is configured to store program instructions and data. The memory is coupled to the at least one processor, and the at least one processor may invoke and execute the program instructions stored in the memory, to enable the apparatus for determining transmit power to perform the method in any one of the first aspect or the possible implementations of the first aspect.

For example, the apparatus for determining transmit power further includes a communication interface, and the communication interface is used by the apparatus for determining transmit power to communicate with another device. When the apparatus for determining transmit power is a terminal, the communication interface is a transceiver, an input/output interface, a circuit, or the like.

In a possible design, the apparatus for determining transmit power includes at least one processor and a communication interface, configured to perform the method in any one of the first aspect or the possible implementations of the first aspect, and the method includes: The at least one processor uses the communication interface to perform external communication; and the at least one processor is configured to run a computer program, to enable the apparatus for determining transmit power to perform the method in any one of the first aspect or the possible implementations of the first aspect. It may be understood that the external communication may be communication with an object other than the processor, or an object other than the apparatus for determining transmit power.

In another possible design, the apparatus for determining transmit power is a chip or a chip system. The communication interface may be an input/output interface, an interface circuit, an output circuit, an input circuit, a pin, a related circuit, or the like in the chip or the chip system. The processor may alternatively be a processing circuit or a logic circuit.

For technical effects brought by any design in the sixth aspect, refer to technical effects brought by different designs in the first aspect. Details are not described herein again.

According to a seventh aspect, an apparatus for determining transmit power is provided, configured to perform the method in any one of the second aspect or the possible implementations of the second aspect. The apparatus for determining transmit power may be the first network device in any one of the second aspect or the possible implementations of the second aspect, or a module applied to the first network device, for example, a chip or a chip system. The apparatus for determining transmit power includes a corresponding module, unit, or means for implementing the foregoing method. The module, unit, or means may be implemented by hardware or software, or may be implemented by hardware executing corresponding software. The hardware or the software includes at least one module or unit corresponding to the foregoing function.

With reference to the seventh aspect, in a possible implementation, the apparatus for determining transmit power includes a transceiver unit, and may further include a processing unit. The transceiver unit is configured to obtain first information, where the first information includes at least one of a path loss, a range of the path loss, signal strength, a range of the signal strength, a channel quality state, and a range of the channel quality state; and the transceiver unit is further configured to send the first information.

Optionally, the transceiver unit is further configured to receive a first uplink signal from a terminal device on a first carrier; or the transceiver unit is further configured to receive the first uplink signal from the terminal device on a second carrier, and the second carrier and the first carrier belong to one carrier group. The processing unit is configured to determine the first information based on the first uplink signal.

Optionally, the transceiver unit is further configured to receive, on the first carrier, the first uplink signal sent by the terminal device at a first power value, where the first power value is included in the first uplink signal, the first power value is preconfigured, or there is an association relationship between a transmission configuration of the first uplink signal and the first power value.

Optionally, the transceiver unit is further configured to send first indication information to a second network device, where the first indication information includes at least one of the path loss, the range of the path loss, the signal strength, the range of the signal strength, the channel quality state, and the range of the channel quality state; or the transceiver unit is further configured to send the first information to the terminal device within a first slot, where the first slot is a downlink slot configured by a first network device for the terminal device.

Optionally, the transceiver unit is further configured to send radio resource control signaling to the terminal device, where the radio resource control signaling includes at least one of a target power value and a path loss compensation factor that are corresponding to the first carrier.

Optionally, the transceiver unit is further configured to send configuration information of the first uplink signal, where the configuration information is specific to the first carrier on a first spectrum, the configuration information is specific to a first carrier group on a first spectrum, the configuration information is specific to the first carrier on a first spectrum and the first network device, or the configuration information is specific to a first carrier group on a first spectrum and the first network device.

With reference to the seventh aspect, in still another possible implementation, the apparatus for determining transmit power includes an input interface, an output interface, and a processing circuit. The input interface is configured to obtain first information, where the first information includes at least one of a path loss, a range of the path loss, signal strength, a range of the signal strength, a channel quality state, and a range of the channel quality state; and the output interface is configured to send the first information.

Optionally, the input interface is further configured to receive a first uplink signal from a terminal device on a first carrier; or the input interface is further configured to receive the first uplink signal from the terminal device on a second carrier, and the second carrier and the first carrier belong to one carrier group. The processing circuit is configured to determine the first information based on the first uplink signal.

Optionally, the input interface is further configured to receive, on the first carrier, the first uplink signal sent by the terminal device at a first power value, where the first power value is included in the first uplink signal, the first power value is preconfigured, or there is an association relationship between a transmission configuration of the first uplink signal and the first power value.

Optionally, the output interface is further configured to send first indication information to a second network device, where the first indication information includes at least one of the path loss, the range of the path loss, the signal strength, the range of the signal strength, the channel quality state, and the range of the channel quality state; or the output interface is further configured to send the first information to the terminal device within a first slot, where the first slot is a downlink slot configured by a first network device for the terminal device.

Optionally, the output interface is further configured to send radio resource control signaling to the terminal device, where the radio resource control signaling includes at least one of a target power value and a path loss compensation factor that are corresponding to the first carrier.

Optionally, the output interface is further configured to send configuration information of the first uplink signal, where the configuration information is specific to the first carrier on a first spectrum, the configuration information is specific to a first carrier group on a first spectrum, the configuration information is specific to the first carrier on a first spectrum and the first network device, or the configuration information is specific to a first carrier group on a first spectrum and the first network device.

For example, the apparatus for determining transmit power further includes a memory, the memory is coupled to at least one processor, and the at least one processor is configured to run program instructions stored in the memory, to enable the apparatus for determining transmit power to perform the method in any one of the second aspect or the possible implementations of the second aspect.

In a possible implementation, the memory is configured to store program instructions and data. The memory is coupled to the at least one processor, and the at least one processor may invoke and execute the program instructions stored in the memory, to enable the apparatus for determining transmit power to perform the method in any one of the second aspect or the possible implementations of the second aspect.

For example, the apparatus for determining transmit power further includes a communication interface, and the communication interface is used by the apparatus for determining transmit power to communicate with another device. When the apparatus for determining transmit power is an access network device, the communication interface is a transceiver, an input/output interface, a circuit, or the like.

In a possible design, the apparatus for determining transmit power includes at least one processor and a communication interface, configured to perform the method in any one of the second aspect or the possible implementations of the second aspect, and the method includes: The at least one processor uses the communication interface to perform external communication; and the at least one processor is configured to run a computer program, to enable the apparatus for determining transmit power to perform the method in any one of the second aspect or the possible implementations of the second aspect. It may be understood that the external communication may be communication with an object other than the processor, or an object other than the apparatus for determining transmit power.

In another possible design, the apparatus for determining transmit power is a chip or a chip system. The communication interface may be an input/output interface, an interface circuit, an output circuit, an input circuit, a pin, a related circuit, or the like in the chip or the chip system. The processor may alternatively be a processing circuit or a logic circuit.

For technical effects brought by any design in the seventh aspect, refer to technical effects brought by different designs in the second aspect. Details are not described herein again.

According to an eighth aspect, an apparatus for determining transmit power is provided, configured to perform the method in any one of the third aspect or the possible implementations of the third aspect. The apparatus for determining transmit power may be the terminal device in any one of the third aspect or the possible implementations of the third aspect, or a module applied to the terminal device, for example, a chip or a chip system. The apparatus for determining transmit power includes a corresponding module, unit, or means for implementing the foregoing method. The module, unit, or means may be implemented by hardware or software, or may be implemented by hardware executing corresponding software. The hardware or the software includes at least one module or unit corresponding to the foregoing function.

With reference to the eighth aspect, in a possible implementation, the apparatus for determining transmit power includes a transceiver unit and a processing unit. The transceiver unit is configured to receive downlink control information, where the downlink control information includes at least one information block, the at least one information block includes at least one piece of the following information: trigger indication information and a closed-loop power control command, and the trigger indication information is used to trigger transmission of a first uplink signal; and the processing unit is configured to determine uplink transmit power on a first carrier based on the downlink control information.

Optionally, the transceiver unit is further configured to obtain a closed-loop power control adjustment state, where the closed-loop power control adjustment state is configured by a second network device for uplink data transmission or uplink signal transmission of the first network device.

With reference to the eighth aspect, in still another possible implementation, the apparatus for determining transmit power includes an input interface, an output interface, and a processing circuit. The input interface is configured to receive downlink control information, where the downlink control information includes at least one information block, the at least one information block includes at least one piece of the following information: trigger indication information and a closed-loop power control command, and the trigger indication information is used to trigger transmission of a first uplink signal; and the processing circuit is configured to determine uplink transmit power on a first carrier based on the downlink control information.

Optionally, the input interface is further configured to obtain a closed-loop power control adjustment state, where the closed-loop power control adjustment state is configured by the second network device for uplink data transmission or uplink signal transmission of the first network device.

For example, the apparatus for determining transmit power further includes a memory, the memory is coupled to at least one processor, and the at least one processor is configured to run program instructions stored in the memory, to enable the apparatus for determining transmit power to perform the method in any one of the third aspect or the possible implementations of the third aspect.

In a possible implementation, the memory is configured to store program instructions and data. The memory is coupled to the at least one processor, and the at least one processor may invoke and execute the program instructions stored in the memory, to enable the apparatus for determining transmit power to perform the method in any one of the third aspect or the possible implementations of the third aspect.

For example, the apparatus for determining transmit power further includes a communication interface, and the communication interface is used by the apparatus for determining transmit power to communicate with another device. When the apparatus for determining transmit power is a terminal, the communication interface is a transceiver, an input/output interface, a circuit, or the like.

In a possible design, the apparatus for determining transmit power includes at least one processor and a communication interface, configured to perform the method in any one of the third aspect or the possible implementations of the third aspect, and the method includes: The at least one processor uses the communication interface to perform external communication; and the at least one processor is configured to run a computer program, to enable the apparatus for determining transmit power to perform the method in any one of the third aspect or the possible implementations of the third aspect. It may be understood that the external communication may be communication with an object other than the processor, or an object other than the apparatus for determining transmit power.

In another possible design, the apparatus for determining transmit power is a chip or a chip system. The communication interface may be an input/output interface, an interface circuit, an output circuit, an input circuit, a pin, a related circuit, or the like in the chip or the chip system. The processor may alternatively be a processing circuit or a logic circuit.

For technical effects brought by any design in the eighth aspect, refer to technical effects brought by different designs in the third aspect. Details are not described herein again.

According to a ninth aspect, an apparatus for determining transmit power is provided, configured to perform the method in any one of the fourth aspect or the possible implementations of the fourth aspect. The apparatus for determining transmit power may be the first network device in any one of the fourth aspect or the possible implementations of the fourth aspect, or a module applied to the first network device, for example, a chip or a chip system. The apparatus for determining transmit power includes a corresponding module, unit, or means for implementing the foregoing method. The module, unit, or means may be implemented by hardware or software, or may be implemented by hardware executing corresponding software. The hardware or the software includes at least one module or unit corresponding to the foregoing function.

With reference to the ninth aspect, in a possible implementation, the apparatus for determining transmit power includes a transceiver unit. The transceiver unit is configured to send downlink control information, where the downlink control information includes at least one information block, the at least one information block includes at least one piece of the following information: trigger indication information and a closed-loop power control command, and the trigger indication information is used to trigger transmission of a first uplink signal.

Optionally, the downlink control information includes a closed-loop power control adjustment state, and the transceiver unit is further configured to send first information to a first network device, where the first information includes the closed-loop power control adjustment state configured by a second network device for uplink data transmission or uplink signal transmission of the first network device.

With reference to the ninth aspect, in still another possible implementation, the apparatus for determining transmit power includes an input interface, an output interface, and a processing circuit. The output interface is configured to send downlink control information, where the downlink control information includes at least one information block, the at least one information block includes at least one piece of the following information: trigger indication information and a closed-loop power control command, and the trigger indication information is used to trigger transmission of a first uplink signal.

Optionally, the downlink control information includes a closed-loop power control adjustment state, and the output interface is further configured to send first information to a first network device, where the first information includes the closed-loop power control adjustment state configured by the second network device for the uplink data transmission or the uplink signal transmission of the first network device.

For example, the apparatus for determining transmit power further includes a memory, the memory is coupled to at least one processor, and the at least one processor is configured to run program instructions stored in the memory, to enable the apparatus for determining transmit power to perform the method in any one of the fourth aspect or the possible implementations of the fourth aspect.

In a possible implementation, the memory is configured to store program instructions and data. The memory is coupled to the at least one processor, and the at least one processor may invoke and execute the program instructions stored in the memory, to enable the apparatus for determining transmit power to perform the method in any one of the fourth aspect or the possible implementations of the fourth aspect.

For example, the apparatus for determining transmit power further includes a communication interface, and the communication interface is used by the apparatus for determining transmit power to communicate with another device. When the apparatus for determining transmit power is an access network device, the communication interface is a transceiver, an input/output interface, a circuit, or the like.

In a possible design, the apparatus for determining transmit power includes at least one processor and a communication interface, configured to perform the method in any one of the fourth aspect or the possible implementations of the fourth aspect, and the method includes: The at least one processor uses the communication interface to perform external communication; and the at least one processor is configured to run a computer program, to enable the apparatus for determining transmit power to perform the method in any one of the fourth aspect or the possible implementations of the fourth aspect. It may be understood that the external communication may be communication with an object other than the processor, or an object other than the apparatus for determining transmit power.

In another possible design, the apparatus for determining transmit power is a chip or a chip system. The communication interface may be an input/output interface, an interface circuit, an output circuit, an input circuit, a pin, a related circuit, or the like in the chip or the chip system. The processor may alternatively be a processing circuit or a logic circuit.

For technical effects brought by any design in the ninth aspect, refer to technical effects brought by different designs in the fourth aspect. Details are not described herein again.

According to a tenth aspect, a communication system is provided, including the apparatus for determining transmit power according to any one of the sixth aspect or the implementations of the sixth aspect, and the apparatus for determining transmit power according to any one of the seventh aspect or the implementations of the seventh aspect.

According to an eleventh aspect, a communication system is provided, including the apparatus for determining transmit power according to any one of the eighth aspect or the implementations of the eighth aspect, and the apparatus for determining transmit power according to any one of the ninth aspect or the implementations of the ninth aspect.

According to a twelfth aspect, a computer-readable storage medium is provided, where the computer-readable storage medium stores a computer program, and when the computer program is run on a computer, the method according to any one of the foregoing aspects or the implementations of the foregoing aspects is performed.

According to a thirteenth aspect, a computer program product is provided. When the computer program product runs on a computer, the method according to any one of the foregoing aspects or the implementations of the foregoing aspects is performed.

According to a fourteenth aspect, a computer program is provided. When the computer program is run on a computer, the method according to any one of the foregoing aspects or the implementations of the foregoing aspects is performed.

DESCRIPTION OF EMBODIMENTS

The following describes embodiments of this application with reference to the accompanying drawings in embodiments of this application.

Figures 1, 2:
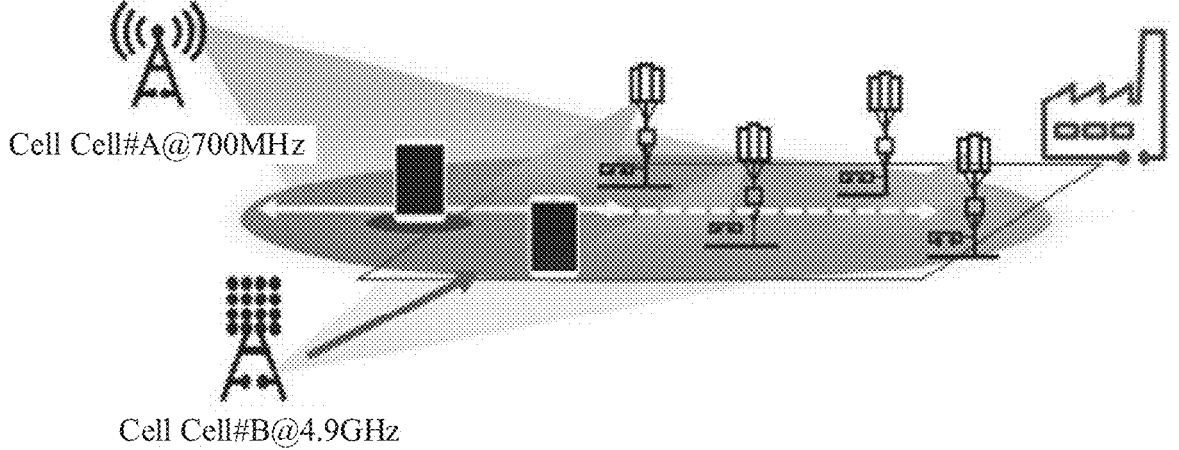
FIG. 1 is a schematic diagram of a structure of a network according to an embodiment of this application.
FIG. 2 is a schematic diagram of a communication system according to an embodiment of this application.

FIG. 1 is a schematic diagram of a structure of a network according to an embodiment of this application. In embodiments of this application, a terminal device may be located in coverage of both of a macro base station (for example, a cell #A in FIG. 1) and a micro base station (for example, a cell #B in FIG. 1), and the terminal device may establish a communication connection to the macro base station and the micro base station. The cell #A occupies a low frequency band, for example, a 700 MHz frequency band, an 800 MHz frequency band, a 2 GHz frequency band, a 1.9 GHz frequency band, a 2.1 GHz frequency band, or a 2.5 GHz frequency band. The cell #B occupies a high frequency band, for example, a 3.5 GHz frequency band or a 4.9 GHz frequency band. A high frequency band may be understood as any frequency band higher than 3.5 GHz, and the "any frequency band" described herein also includes a millimeter-wave frequency band. For example, a high frequency band of 4.9 GHz may include at least one carrier, and these carriers may be all-uplink carriers or uplink-dominant (UL dominant) carriers.

The technical solutions in embodiments of this application may be applied to various communication systems. For example, the communication system may be an LTE system, an LTE frequency division duplex (FDD) system, an LTE time division duplex (TDD) system, a 5th generation (5G) system or a new radio (NR), or a next generation communication system such as 6G. The 5G mobile communication system in embodiments of this application includes a non-standalone (NSA) 5G mobile communication system or a standalone (SA) 5G mobile communication system. The technical solutions provided in this application may be further applied to a future communication system, for example, a sixth generation mobile communication system. Alternatively, the communication system may be a public land mobile network (PLMN) network, a device-to-device (D2D) communication system, a machine to machine (M2M) communication system, an internet of things (IoT) communication system, an internet of vehicles communication system, or another communication system.

FIG. 2 is a schematic diagram of a communication system according to this application. The communication system may include a first network device 201, a second network device 202, and a terminal device 203 connected to the first network device 201 and the second network device 202. The first network device 201 may be the micro base station in FIG. 1, and occupies a high frequency band, for example, 4.9 GHz. The second network device 202 may be the macro base station in FIG. 1, and occupies a low frequency band.

The terminal device 203 in this embodiment of this application may be an access terminal, a subscriber unit, a subscriber station, a mobile station, a mobile console, a relay station, a remote station, a remote terminal, a mobile device, a user terminal, user equipment (UE), a terminal, or a wireless communication device, a user agent, a user apparatus, a cellular phone, a cordless phone, a session initiation protocol (SIP) phone, a wireless local loop (WLL) station, a personal digital assistant (PDA), or a handheld device having a wireless communication function, a computing device, another processing device connected to a wireless modem, a vehicle-mounted device, a wearable device, a terminal in a future 5G network, a terminal in a future evolved PLMN, a terminal in a future internet of vehicles, or the like. This is not limited in this embodiment of this application.

By way of example but not limitation, in this embodiment of this application, the terminal device 203 may be a mobile phone, a tablet computer, a computer having a wireless transceiver function, a virtual reality terminal, an augmented reality terminal, a wireless terminal in industrial control, a wireless terminal in uncrewed driving, a wireless terminal in remote surgery, a wireless terminal in a smart grid, a wireless terminal in transportation safety, a wireless terminal in a smart city, a wireless terminal in a smart home, or the like.

By way of example but not limitation, in this embodiment of this application, the wearable device may also be referred to as a wearable intelligent device, and is a general term of wearable devices, such as glasses, gloves, watches, clothes, and shoes that are developed by applying wearable technologies to intelligent designs of daily wear. The wearable device is a portable device that can be directly worn on a body or integrated into clothes or an accessory of a user. The wearable device is not merely a hardware device, but is used to implement a powerful function through software support, data exchange, and cloud interaction. Generalized wearable intelligent devices include full-featured and large-size devices that can implement complete or partial functions without depending on smartphones, such as smart watches or smart glasses, and devices that are dedicated to only one type of application and need to work with other devices such as smartphones, such as various smart bands or smart jewelry for monitoring physical signs.

In addition, in this embodiment of this application, the terminal device 203 may alternatively be a terminal in an IoT system. The IoT is an important part of future information technology development. A main technical feature of the IoT is that an object is connected to a network using a communication technology, to implement an intelligent network for human-machine interconnection and thing-thing interconnection. In this embodiment of this application, the IoT technology may implement massive connections, deep coverage, and terminal power saving using, for example, a narrow band (NB) technology.

In addition, in this embodiment of this application, the terminal device 203 may further include a sensor, for example, an intelligent printer, a train detector, or a gas station. Main functions of the terminal device 203 include collecting data (for some terminals), receiving control information and downlink data of an access network device, sending an electromagnetic wave, and transmitting uplink data to the access network device.

Optionally, the first network device 201/the second network device 202 in this embodiment of this application may be any communication device that has a wireless transceiver function and that is configured to communicate with the terminal device 203. The first network device 201/the second network device 202 includes but is not limited to: an evolved NodeB (eNB), a baseband unit (BBU), an access point (AP) in a Wi-Fi system, a wireless relay node, and a wireless backhaul node, a transmission point (TP), a transmission reception point (TRP), or the like. Alternatively, the first network device 201/the second network device 202 may be a gNB, a TRP, or a TP in the 5G system, or one or a group of antenna panels (including a plurality of antenna panels) of a base station in the 5G system. In addition, the first network device 201/the second network device 202 may alternatively be a network node forming a gNB or a TP, for example, a BBU or a distributed unit (DU). Alternatively, the first network device 201/the second network device 202 may be a network device in a 5.5G or 6G system.

In some deployments, a gNB may include a central unit (CU) and a DU. In addition, the gNB may further include an active antenna unit (AAU). The CU implements some functions of the gNB, and the DU implements some functions of the gNB. For example, the CU is responsible for processing a non-real-time protocol and service, and implements functions of an RRC layer and a Packet Data Convergence Protocol (PDCP) layer. The DU is responsible for processing a physical layer protocol and a real-time service, and implements functions of a radio link control (RLC) layer, a media access control (MAC) layer, and a physical layer (PHY layer or PHY for short). The AAU implements some physical layer processing functions, radio frequency processing, and a function related to an active antenna. Information at the RRC layer eventually becomes information at the PHY layer, or is changed from information at the PHY layer. Therefore, in this architecture, higher-layer signaling such as RRC layer signaling may also be considered as being sent by the DU or sent by the DU and the AAU. It may be understood that the access network device may be a device including one or more of a CU node, a DU node, and an AAU node.

Optionally, the first network device 201/the second network device 202 and the terminal device 203 in this embodiment of this application may communicate with each other using a licensed spectrum, may communicate with each other using an unlicensed spectrum, or may communicate with each other using both of a licensed spectrum and an unlicensed spectrum. The first network device 201 and the terminal device 203 may communicate with each other using a relatively high spectrum (for example, 4.9 GHz), and the second network device 202 and the terminal device 203 may communicate with each other using a relatively low spectrum (for example, 2.5 GHz).

Optionally, the first network device 201, the second network device 202, and the terminal device 203 in this embodiment of this application may be deployed on land, including indoor or outdoor, handheld, or a vehicle-mounted device; may be deployed on the water; or may be deployed on an airplane, a balloon, or a satellite in the air. Application scenarios of the first network device 201, the second network device 202, and the terminal device 203 are not limited in this embodiment of this application.

Optionally, in this embodiment of this application, the first network device 201, the second network device 202, and the terminal device 203 include a hardware layer, an operating system layer running above the hardware layer, and an application layer running above the operating system layer. The hardware layer includes hardware such as a central processing unit (CPU), a memory management unit (MMU), and a memory (also referred to as a main memory). The operating system may be any one or more types of computer operating systems that implement service processing through a process, for example, a Linux operating system, a UNIX operating system, an Android operating system, an iOS operating system, or a Windows operating system. The application layer includes applications such as a browser, an address book, word processing software, and instant messaging software. In addition, a structure of an execution body of the method provided in this embodiment of this application is not limited in this embodiment of this application, provided that a program that records code of the method provided in this embodiment of this application can be run, to perform communication according to the method provided in this embodiment of this application. For example, the execution body of the method provided in this embodiment of this application may be the first network device 201, the second network device 202, and the terminal device 203, or may be a functional module that is in the first network device 201, the second network device 202, and the terminal device 203 and that can invoke and execute a program.

In other words, related functions of the first network device 201, the second network device 202, and the terminal device 203 in this embodiment of this application may be implemented by one device, may be jointly implemented by a plurality of devices, or may be implemented by at least one function module in one device. This is not specifically limited in this embodiment of this application. It may be understood that the foregoing function may be a network element in a hardware device, a software function running on dedicated hardware, a combination of hardware and software, or a virtualization function instantiated on a platform (for example, a cloud platform).

Figure 3:
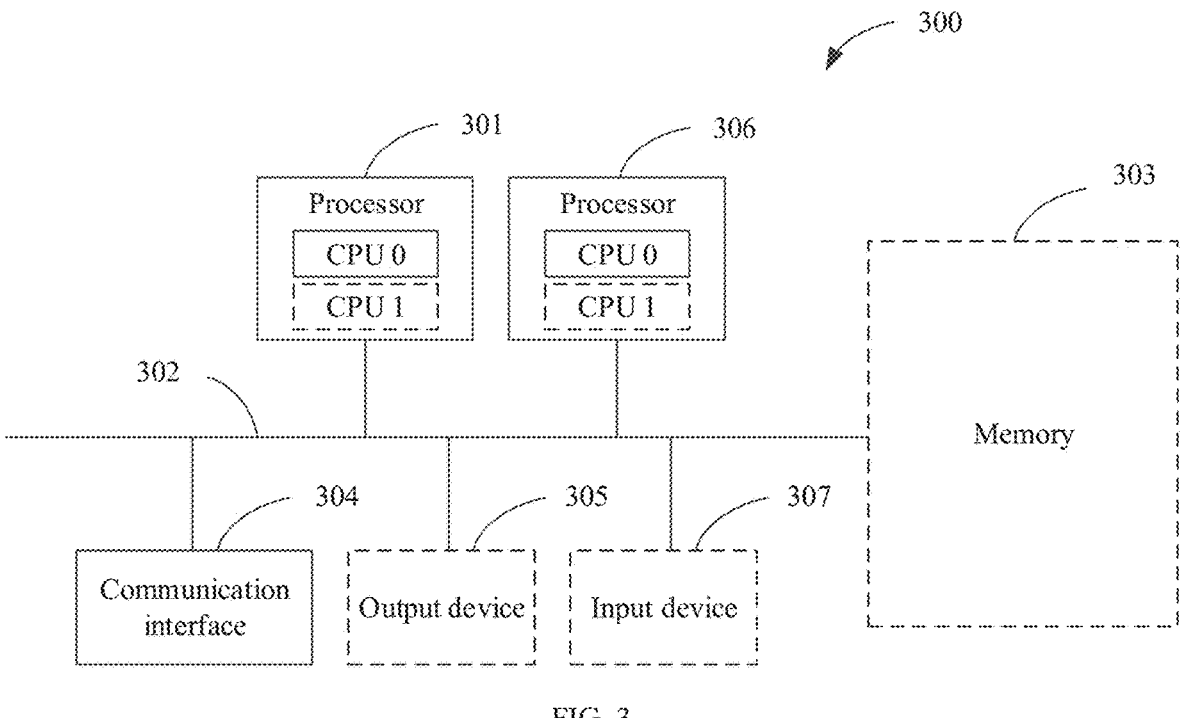
FIG. 3 is a schematic diagram of a structure of an apparatus 300 for determining transmit power according to an embodiment of this application.

For example, related functions of the first network device 201, the second network device 202, and the terminal device 203 in this embodiment of this application may be implemented using an apparatus 300 for determining transmit power in FIG. 3. FIG. 3 is a schematic diagram of a structure of the apparatus 300 for determining transmit power according to an embodiment of this application. The apparatus 300 for determining transmit power includes at least one processor 301, a communication line 302, and at least one communication interface (FIG. 3 is merely an example in which a communication interface 304 and one processor 301 are included for description), and optionally, the apparatus 300 for determining transmit power may further include a memory 303.

The processor 301 may be a central processing unit (CPU), a microprocessor, an application-specific integrated circuit (ASIC), or at least one integrated circuit configured to control program execution in the solutions of this application.

The communication line 302 may include a path used to connect different components.

The communication interface 304 may be a transceiver module configured to communicate with another device or a communication network, such as the Ethernet, a radio access network (RAN), or a wireless local area network (WLAN). For example, the transceiver module may be an apparatus such as a transceiver or a transceiver. Optionally, the communication interface 304 may alternatively be a transceiver circuit located inside the processor 301, and is configured to implement signal input and signal output of the processor.

The memory 303 may be an apparatus having a storage function. For example, the memory 303 may be a read-only memory (ROM) or another type of static storage device that can store static information and instructions, or a random-access memory (RAM) or another type of dynamic storage device that can store information and instructions, or may be an electrically erasable programmable read-only memory (EEPROM), a compact disc read-only memory (CD-ROM) or another compact disc storage, an optical disc storage (including a compact disc, a laser disc, an optical disc, a digital versatile disc, a Blu-ray optical disc, and the like), a magnetic disk storage medium or another magnetic storage device, or any other medium that can be used to carry or store expected program code in a form of instructions or a data structure and that can be accessed by a computer. However, the memory 303 is not limited thereto. The memory may exist independently, and is connected to the processor through the communication line 302. The memory may alternatively be integrated with the processor 301.

The memory 303 is configured to store computer-executable instructions for executing the solutions in this application, and the processor 301 controls execution of the computer-executable instructions. The processor 301 is configured to execute the computer-executable instructions stored in the memory 303, to implement the method for determining transmit power provided in this embodiment of this application.

Alternatively, in this embodiment of this application, the processor 301 may perform a processing-related function in a method for determining transmit power provided in following embodiments of this application, and the communication interface 304 is responsible for communicating with another device or a communication network. This is not specifically limited in this embodiment of this application.

The computer-executable instructions in this embodiment of this application may also be referred to as application program code. This is not specifically limited in this embodiment of this application.

In an implementation, in an embodiment, the processor 301 may include at least one CPU, for example, a CPU 0 and a CPU 1 in FIG. 3.

In an implementation, in an embodiment, the apparatus 300 for determining transmit power may include a plurality of processors, for example, the processor 301 and a processor 306 in FIG. 3. Each of the processors may be a single-core (single-CPU) processor, or may be a multi-core (multi-CPU) processor. The processor herein may be at least one device, a circuit, and/or a processing core configured to process data (for example, computer program instructions).

In an implementation, in an embodiment, the apparatus 300 for determining transmit power may further include an output device 305 and an input device 307. The output device 305 communicates with the processor 301, and may display information in a plurality of manners.

The apparatus 300 for determining transmit power may be a general-purpose apparatus or a dedicated apparatus. For example, the apparatus 300 for determining transmit power may be a desktop computer, a portable computer, a network server, a palmtop computer (e.g., personal digital assistant (PDA)), a mobile phone, a tablet computer, a wireless terminal, an embedded device, or a device having a structure similar to a structure in FIG. 3. A type of the apparatus 300 for determining transmit power is not limited in this embodiment of this application.

In a current power control solution, a terminal device determines transmit power of the terminal device according to a predefined formula. For example, transmit power of an uplink sounding reference signal (SRS) may be obtained using the following formula 1:

$$P_{SRS,c}(i)=\min\{P_{CMAX,c}(i),P_{SRS\_OFFSET,c}(m)+10\log_{10}$$
$$(M_{SRS,c})+P_{O\_PUSC,c}(j)+\alpha_c(j)\cdot PL_c+f_c(i)\} \qquad \text{Formula 1}$$

$P_{CMAX,c}(i)$ is maximum transmit power of UE. $P_{SRS\_OFFSET,c}(m)$ is an SRS transmit power adjustment value, m=0 and m=1 respectively indicate a transmit power adjustment value of a periodic SRS and a transmit power adjustment value of an aperiodic SRS. A value range of the transmit power adjustment value is determined by a higher-layer parameter Ks. When Ks=0, the value range is [−10.5, 12], and a step is 1.5 dB. When Ks=1.25, the value range of Ks is [−3, 12], and a step is 1 dB. A specific value is notified by higher layer signaling. $M_{SRS,c}$ is an SRS transmission bandwidth. $P_{O\_PUSCH,c}(j)$ is a sum of a cell broadcast parameter Po_normimal_PUSCH and a UE-specific high-layer power control parameter Po_ue_PUSCH. $\alpha_c(j)$ is a path loss compensation factor. $PL_C$ is a downlink path loss estimation measured by a UE side, a value of $PL_C$ is a ratio of transmit power of a cell reference signal (CRS) of a downlink base station to reference signal received power (RSRP) reported by the UE. $f_c(i)$ is a closed-loop power control parameter, and is obtained using a closed-loop power control command (TPC command) in downlink control information (DCI) format in O/4/3/3A. $f_c(i)$ may be an accumulated value or an absolute value. When accumulation is performed, $f_c(i)$ may be an accumulated value of a previous value and delta, or may be an absolute value based on notification of physical downlink control channel (PDCCH) signaling.

However, carriers on a first spectrum are all-uplink carriers or uplink-dominant carriers. As a result, it is difficult for the terminal device to obtain the foregoing parameters. Therefore, this application provides a solution for determining transmit power. The terminal device may accurately determine uplink transmit power on a first carrier based on first information sent by a first network device. In this way, the uplink transmit power on the first carrier is accurately controlled, communication reliability is improved, and power consumption of the terminal device is reduced.

The following describes in detail the method for determining transmit power provided in embodiments of this application with reference to FIG. 1 to FIG. 7.

It should be noted that names of messages between network elements, names of parameters in the messages, or the like in embodiments of this application are merely examples, and there may alternatively be other names in an implementation. This is not specifically limited in embodiments of this application.

Embodiments of this application may be used separately or jointly.

In this application, a high frequency band/a low frequency band is used as an example in the following. The high frequency band may be replaced with a second frequency band. The low frequency band may be replaced with a first frequency band. The first frequency band may be a licensed frequency band, the second frequency band may be an unlicensed frequency band, or the first frequency band may be a low spectrum, and the second frequency band may be a high spectrum.

In this application, the carrier may alternatively be replaced with a "beam". Correspondingly, the first carrier may be a first beam, and an $X^{th}$ carrier may be an $X^{th}$ beam.

Similarly, "active carrier" may be "active beam", and a carrier identifier may be a beam identifier.

"For uplink measurement" may indicate whether a carrier is active or whether a carrier is selected for data transmission. Alternatively, "for uplink measurement" may indicate whether a beam is active or whether a beam is selected for data transmission. This is applicable to a case in which the second frequency band is a high frequency, for example, the second spectrum is a millimeter wave.

In this embodiment of this application, a closed-loop power control command may also be referred to as closed-loop power control information. Supplementary uplink can be replaced with super uplink. Supplementary uplink is used for uplink capacity expansion or coverage expansion.

In this embodiment of this application, system information is a remaining system information block (RMSB), or system information is a on demand based system information block.

Receiving in this embodiment of this application may also be understood as detecting, probing, or monitoring.

Figure 4:
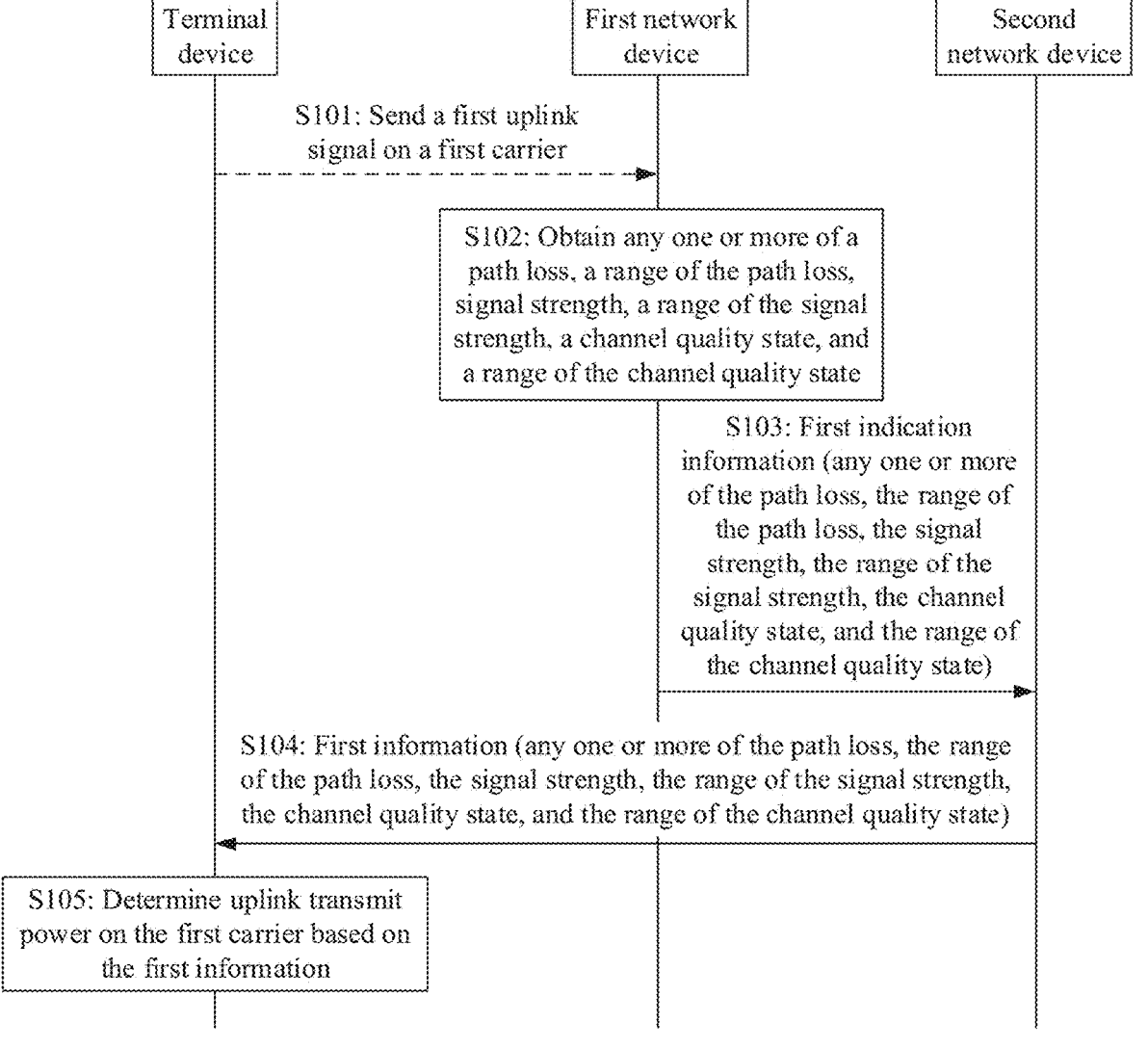
FIG. 4 is a schematic flowchart of a method for determining transmit power according to an embodiment of this application.

FIG. 4 is a schematic flowchart of a method for determining transmit power according to an embodiment of this application. For example, the method may include the following.

S101: A terminal device sends a first uplink signal to a first network device on a first carrier. Correspondingly, the first network device receives the first uplink signal on the first carrier.

A frequency band used for supplementary uplink includes at least one first carrier. A terminal device may send the first uplink signal on all first carriers, or send the first uplink signal on any quantity of first carriers. The terminal device may send, on each first carrier, the first uplink signal to the first network device in a specified time period. Correspondingly, the first network device receives, on each first carrier, the first uplink signal sent by the terminal device. In this embodiment of this application, setting may be understood as preset, predefined, or preconfigured. In this embodiment of this application, it is preconfigured that a first network device or a second network device configures using radio resource control (RRC) signaling.

The first uplink signal may be a channel sounding reference signal (SRS), a preamble (preamble code), a demodulation reference signal (DMRS), a channel state information-reference signal (CSI-RS), or any conventional or newly defined sequence. The first uplink signal is used for uplink measurement, and may be referred to as an uplink measurement signal. Uplink measurement may also be understood as uplink detection. When the first uplink signal is used for the uplink measurement, the first uplink signal is used to determine whether a carrier is active, or is used to determine whether a carrier is selected for data transmission. An SRS is used as an example. The uplink measurement signal may be an access channel sounding signal (access-SRS) or a radio resource management channel sounding signal (e.g., a radio resource management-sounding reference signal (RRM-SRS)). The preamble may be referred to as a preamble sequence, a preamble signal, or a preamble. The sequence may be a Zadoff-Chu sequence (ZC sequence), a maximum length sequence (m-sequence), any combination sequence of a ZC sequence and an m sequence, or may be another computer-generated sequence (CGS).

In this embodiment of this application, any of the foregoing content is configured by the second network device, such that configuration information of the terminal device can be indicated on a premise that there is only an uplink slot between the first network device and the terminal device.

Any of the foregoing content is configured by the first network device, such that configuration information of the terminal device can be indicated on a premise that there is a downlink slot or downlink symbol transmission between the first network device and the terminal device.

At least one first carrier that meets a specified condition may belong to one first carrier group. The specified condition may be, for example, that carrier locations are adjacent, or carriers have common attribute information.

The first uplink signal is used by the first network device to obtain the first information corresponding to the first carrier. However, the first network device may alternatively obtain the first information in another manner. Therefore, this step is optional, and is represented by a dashed line in the figure.

For example, the terminal device may trigger sending of the first uplink signal for uplink measurement in cases including but not limited to the following.

In one case, the second network device triggers sending of the first uplink signal for uplink measurement. For example, the second network device may learn of a measurement reporting result of the terminal device, estimate a location of the terminal device, and determine, with reference to a location of the first network device, whether to trigger the terminal device to send the first uplink signal.

In another case, a service feature of the terminal device triggers sending of the first uplink signal for uplink measurement. For example, when the terminal device has an uplink capacity/coverage-sensitive service, the terminal device may trigger uplink measurement.

In still another case, mobility of the terminal device triggers sending of the first uplink signal for uplink measurement. For example, when the terminal device moves to a cell edge and needs to perform coverage, the terminal device may trigger uplink measurement.

The foregoing several cases may be used in combination, to reduce unnecessary transmission of the first uplink signal.

Once sending of the first uplink signal is triggered, the sending of the first uplink signal may be one-time (one shot) or semi-persistent transmission. The semi-persistent transmission may also be referred to as semi-persistent scheduling. The first network device or the second network device may configure to send the first uplink signal once or semi-persistently. At least one of duration, a transmission period, or a quantity of transmission times of the semi-persistent transmission may be configured by the second network device or the first network device using signaling. The signaling may be any one of RRC, media access control (MAC), or physical layer signaling. Therefore, it is ensured that the terminal device is served by a correct first network device and a corresponding carrier.

In this embodiment of this application, any "configured" or "configurable" may be understood as being configured by the first network device or the second network device using the RRC signaling, or may be understood as being configured by the first network device or the second network device using the MAC layer signaling or the physical layer signaling.

S102: The first network device determines any one or more of a path loss, a range of the path loss, signal strength, a range of the signal strength, a channel quality state, and a range of the channel quality state.

After the first network device receives the first uplink signal on the first carrier, the first network device may determine, based on the first uplink signal, first information corresponding to the first carrier, or the first network device may determine the first information corresponding to the first carrier in another manner. The first information reflects signal transmission performance on the first carrier. The first information is used by the terminal device to determine uplink transmit power. Therefore, the first information may also be referred to as power control information or a power control parameter.

In this embodiment, the first information may be a path loss (a "path loss"). The path loss may also be referred to as a reference path loss. In this embodiment of this application, the path loss may be an absolute path loss, or may be a relative path loss. The absolute path loss is an absolute value of the path loss, and the relative path loss is a relative value of the path loss. Optionally, the relative value of the path loss may be an offset relative to a previously indicated path loss. For example, the relative value of the path loss may be an offset relative to a path loss indicated last time.

The first information may also be a range of the path loss. In this embodiment of this application, the range of the path loss may be preconfigured. To be more specific, the range of the path loss is notified to the terminal device using RRC signaling, or is predefined to the terminal device. When the second network device sends the range of the path loss, the second network device may send an index value corresponding to the range. This helps reduce system signaling costs. As an example, the range of the path loss may be an index value that is corresponding to a range to which the path loss belongs and that is determined based on a preconfigured range of the path loss. Optionally, the range of the path loss may also be an offset relative to a previously indicated range of the path loss.

Alternatively, the first information may be signal strength. In this embodiment of this application, the signal strength may be absolute signal strength, or may be relative signal strength. The absolute signal strength is an absolute value of the signal strength, and the relative signal strength is a relative value of the signal strength. Optionally, the relative value of the signal strength may be an offset relative to previously indicated signal strength. For example, the relative value of the signal strength may be an offset relative to signal strength indicated last time. In this embodiment of this application, the signal strength may be signal strength of a layer 1 (L1) or signal strength obtained by filtering a layer 3 (L3). A relationship between the signal strength and the path loss is as follows: The path loss is a difference between transmit power of the first uplink signal and signal strength that is of the first uplink signal and that is determined by the first network device.

Alternatively, the first information may be a range of signal strength. In this embodiment of this application, the range of the signal strength may be preconfigured. To be more specific, the range of the signal strength is notified to the terminal device using RRC signaling, or is predefined to the terminal device. When the second network device sends the range of the signal strength, the second network device may send an index value corresponding to the range. This helps reduce system signaling costs. As an example, the range of the signal strength may be an index value that is corresponding to a range to which the signal strength belongs and that is determined based on a preconfigured range of the signal strength. Optionally, the range of the signal strength may also be an offset relative to a previously indicated range of the signal strength.

Alternatively, the first information may be a channel quality state (CSI). The channel quality state includes at least one of a signal to noise ratio (SNR), a signal to interference plus noise ratio (SINR), a channel quality index (CQI), a precoding type indicator (PTI), a precoding matrix index (PMI), and a transmission order index (e.g., a rank index (RI)). When a first spectrum is a high frequency, the channel quality state further includes beam-specific signal strength (beam specific RSRP/RSRQ/RSSI) or cell-specific signal strength (cell specific RSRP/RSRQ/RSSI). In this embodiment of this application, the beam-specific signal strength may also be referred to as beam signal strength. The cell-specific signal strength may also be referred to as cell signal strength. The cell-specific signal strength is generated based on the beam-specific signal strength. For example, the cell-specific signal strength is generated by performing linear averaging or non-linear averaging on the beam-specific signal strength. When the first spectrum is a high frequency, the first spectrum is a millimeter wave band or a centimeter wave band. In this embodiment of this application, the channel quality state may be an absolute channel quality state or a relative channel quality state. The absolute channel quality state is an absolute value of the channel quality state, and the relative channel quality state is a relative value of the channel quality state. Optionally, the relative value of the channel quality state may be an offset relative to a previously indicated channel quality state.

Alternatively, the first information may be a range of a channel quality state. In this embodiment of this application, the range of the channel quality state may be preconfigured. To be more specific, the range of the channel quality state is notified to the terminal device using RRC signaling, or is predefined to the terminal device. When the second network device sends the range of the channel quality state, the second network device may send an index value corresponding to the range. This helps reduce system signaling costs. As an example, the range of the channel quality state may be an index value that is corresponding to a range to which the channel quality state belongs and that is determined based on a preconfigured range of the channel quality state. Optionally, the range of the channel quality state may also be an offset relative to a previously indicated range of the channel quality state.

In this embodiment, the first carrier is an all-uplink carrier. Therefore, step S103 may be further included.

S103: The first network device sends first indication information to the second network device. Correspondingly, the second network device receives the first indication information.

For example, the first network device may send the first indication information to the second network device through an X2 interface. The first indication information indicates any one or more of the path loss, the range of the path loss, the signal strength, the range of the signal strength, the channel quality state, and the range of the channel quality state. In this embodiment of this application, "indication" may be a direct indication, or may be an implicit indication. For example, any information that can enable the second network device to learn of any one or more of the path loss, the range of the path loss, the signal strength, the range of the signal strength, the channel quality state, and the range of the channel quality state may be considered as the first indication information.

S104: The second network device sends the first information to the terminal device. Correspondingly, the terminal device receives the first information.

After the second network device receives the first indication information sent by the first network device, the second network device sends the first information to the terminal device.

The first information may include any one or more of the path loss, the range of the path loss, the signal strength, the range of the signal strength, the channel quality state, and the range of the channel quality state.

In this embodiment of this application, the first indication information is information transmitted on an interface between network devices, and the first information is information sent by a network device to the terminal device. The first information is determined based on the first indication information. The first indication information and the first information may be same information, or may be different information. Content included in the first indication information and the first information may be completely the same, or may be partially the same. When the first indication information is completely the same as the first information, that the second network device sends the first information may be understood as follows: The second network device forwards the first indication information.

In an implementation, there is a first backhaul between the first network device and the second network device. The first backhaul may be understood as follows: The first network device is an antenna of the second network device. The antenna is a remote antenna. Therefore, information between the first network device and the second network device may be shared. The first backhaul may also be understood as follows: The second network device is a baseband unit (base band unit (BBU)), the first network device is a remote radio unit (RRU), and information between the first network device and the second network device may be shared. In this case, step S103 does not need to be performed, and step S104 may be directly performed.

In another implementation, there is a second backhaul between the first network device and the second network device. The second backhaul line may be understood as follows: A backhaul link between the first network device and the second network device is an X2, X3, or Xn interface. Optionally, a capacity/delay of the second backhaul may not be limited, and the second backhaul is an ideal backhaul. In this case, step S103 needs to be performed before step S104.

In still another implementation, there is a third backhaul between the first network device and the second network device. The third backhaul may be understood as a wireless backhaul link between the first network device and the second network device. Optionally, the third backhaul is a wireless integrated access and backhaul (IAB) link. In this case, step S103 needs to be performed before step S104.

It may be understood that a frequency band used for supplementary uplink includes at least one first carrier, and the at least one first carrier may be divided into at least one carrier group. The first information may be specific to the first carrier, or may be specific to a first carrier group to which the first carrier belongs. Configuration information of the first carrier group may be notified to the terminal device using another message. The first carrier group includes a carrier group on which the terminal device sends the first uplink signal. For example, the foregoing path loss is a path loss corresponding to the first carrier or the first carrier group. The range of the path loss is a range of the path loss corresponding to the first carrier or the first carrier group. The signal strength is signal strength corresponding to the first carrier or the first carrier group. The range of signal strength is a range of the signal strength corresponding to the first carrier or the first carrier group. The signal quality state is a signal quality state corresponding to the first carrier or the first carrier group. The range of the signal quality state is a range of the signal quality state corresponding to the first carrier or the first carrier group. The first carrier is an uplink carrier or a carrier whose uplink slot configuration domi- nates in a slot configuration, and the first carrier is a carrier in the first carrier group.

In this embodiment of this application, the first informa- tion may be specific to the first carrier, and it may be understood that the first information is configured for the first carrier. Alternatively, the first information may be specific to the first carrier group to which the first carrier belongs, and it may be understood that the first information is configured for the first carrier group to which the first carrier belongs. The first information may be any one or more of the path loss, the range of the path loss, the signal strength, the range of the signal strength, the channel quality state, and the range of the channel quality state.

S105: The terminal device determines uplink transmit power on the first carrier based on the first information.

After the terminal device receives the first information fed back by the first network device, the terminal device may adjust and control transmit power of subsequent uplink information based on the first information, to improve communication reliability and reduce power consumption of the terminal device.

According to the method for determining transmit power provided in this embodiment of this application, the terminal device may accurately determine the uplink transmit power on the first carrier based on the first information sent by the first network device. In this way, the uplink transmit power on the first carrier is accurately controlled, communication reliability is improved, and power consumption of the ter- minal device is reduced.

Figure 5:
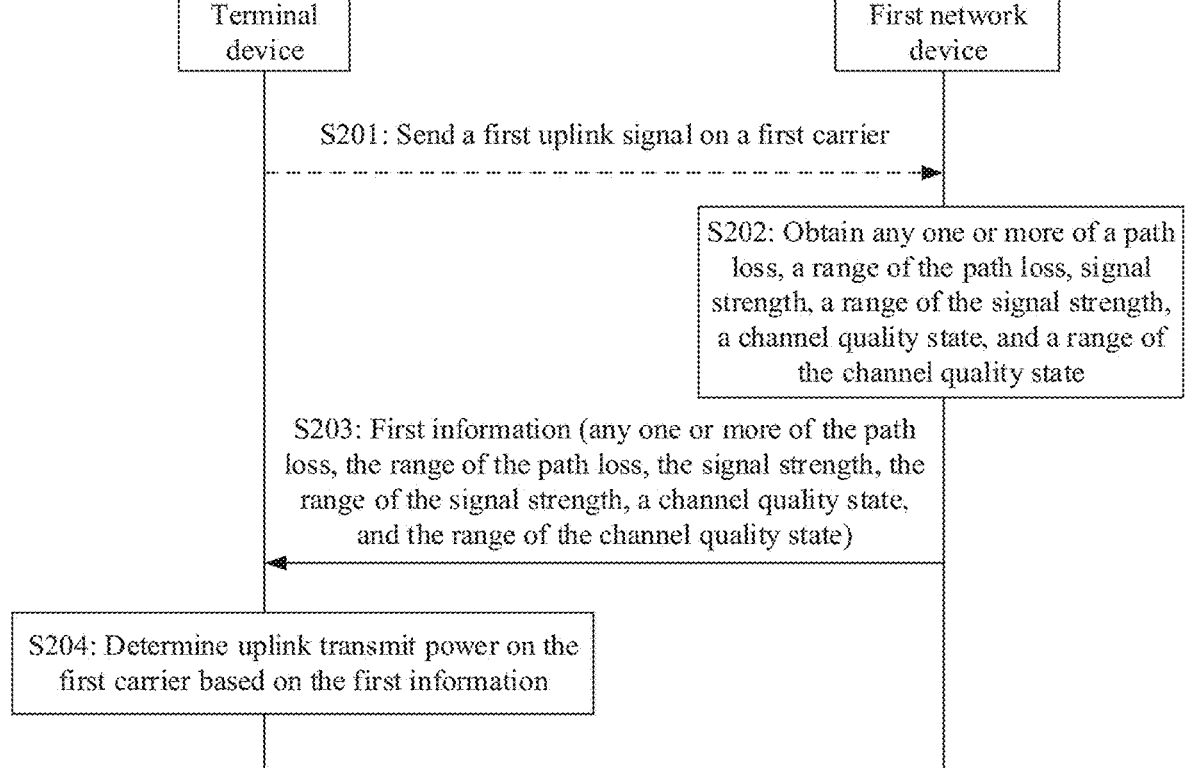
FIG. 5 is still another schematic flowchart of a method for determining transmit power according to an embodiment of this application.

FIG. 5 is still another schematic flowchart of a commu- nication method according to an embodiment of this appli- cation. Different from the embodiment shown in FIG. 4, in this embodiment, the first carrier is configured as an uplink- dominant carrier (UL dominant carrier), that is, there are more uplink slots than downlink slots. In this case, the first network device may send the first information to the termi- nal device within a small quantity of downlink slots. For example, the method may include the following steps.

S201: The terminal device sends a first uplink signal to a first network device on the first carrier. Correspondingly, the first network device receives the first uplink signal on the first carrier.

For implementation of this step, refer to step S101 in the embodiment shown in FIG. 4.

S202: The first network device determines any one or more of a path loss, a range of the path loss, signal strength, a range of the signal strength, a channel quality state, and a range of the channel quality state.

For implementation of this step, refer to step S102 in the embodiment shown in FIG. 4.

S203: The first network device sends first information to the terminal device. Correspondingly, the terminal device receives the first information.

The first information includes any one or more of the path loss, the range of the path loss, the signal strength, the range of the signal strength, the channel quality state, and the range of the channel quality state.

Because there are a small quantity of downlink slots configured by the first network device for the terminal device, the first network device may send the first informa- tion within at least one of the small quantity of downlink slots.

In this embodiment of this application, an all-uplink carrier is a carrier whose slots are all uplink slots in an uplink-downlink slot configuration. In the uplink-downlink slot configuration, uplink slots account for a large proportion, and downlink slots account for a small proportion. As an example, an uplink-downlink slot configuration of an uplink-dominant carrier is as follows: Every X slots are considered as a slot configuration period, and in the period, there are Y downlink slots and the remaining X-Y lots are all uplink slots. X may be a larger positive integer relative to Y, for example, 20, 30, 40, or 60. Correspondingly, Y is a smaller positive integer relative to X, for example, 1, 2, or 3. For example, in an uplink-dominant carrier, uplink slots and downlink slots may be configured as one downlink slot and X–1 uplink slots that are sequentially cycled, or may be configured as X–1 uplink slots and one downlink slot that are sequentially cycled. Provided that one slot includes a downlink symbol, the slot may be referred to as a downlink slot. In other words, the downlink slot may be understood as a slot including a downlink symbol. The downlink symbols may be consecutive or non-consecutive. Optionally, a fre- quency band or a frequency band part (band width partial (BWP)) or a physical resource block (PRB) in which the downlink symbol is located is configurable.

S204: The terminal device determines uplink transmit power on the first carrier based on the first information.

For implementation of this step, refer to step S105 in the embodiment shown in FIG. 4.

According to the method for determining transmit power provided in this embodiment of this application, the terminal device may accurately determine the uplink transmit power on the first carrier based on the first information sent by the first network device. In this way, the uplink transmit power on the first carrier is accurately controlled, communication reliability is improved, and power consumption of the ter- minal device is reduced.

In any embodiment of this application, the first uplink signal may be used for both of random access and uplink measurement. Random access may also be understood as obtaining a timing advance (TA), and the timing advance may also be referred to as a time advance amount, a timing advance value, or a timing advance amount. Optionally, the first uplink signal may be a preamble. The first information may be a random access response (RAR) message.

Optionally, the random access response message may further include a carrier identifier or an identifier of a carrier group. For example, the random access response message may include at least one piece of first information, and the carrier identifier is in a one-to-one correspondence with the first information, or the identifier of the carrier group is in a one-to-one correspondence with the first information. Optionally, the random access response message may fur- ther include time indication information, and the time indi- cation information indicates the first network device to determine time information of the first information. Corre- spondingly, there is a specific delay when the terminal device determines the uplink transmit power based on the first information.

In any embodiment of this application, the network device may alternatively broadcast a system information block (SIB) within the foregoing small quantity of downlink slots, and the SIB carries the first information. Optionally, the SIB may further include an identity of at least one terminal, and the identity of the terminal is corresponding to the first information. For example, the SIB may include at least one piece of first information, and the identifier of the terminal is in a one-to-one correspondence with the first information.

Optionally, the SIB may further include a carrier identifier or an identifier of a carrier group. For example, the SIB may include at least one piece of first information, and the carrier identifier is in a one-to-one correspondence with the first information, or the identifier of the carrier group is in a one-to-one correspondence with the first information. Optionally, the SIB may further include time indication information, and the time indication information indicates the first network device to determine time information of the first information. Correspondingly, there is a specific delay when the terminal device determines the uplink transmit power based on the first information.

In any embodiment of this application, the network device may further add the first information to an RRC message, and the first information is dedicated to the terminal device. Similarly, the RRC message may also include at least one of the carrier identifier, the identifier of the carrier group, and the time indication information.

The foregoing network device is the second network device in Embodiment 1, and is the first network device in Embodiment 2.

Figure 6:
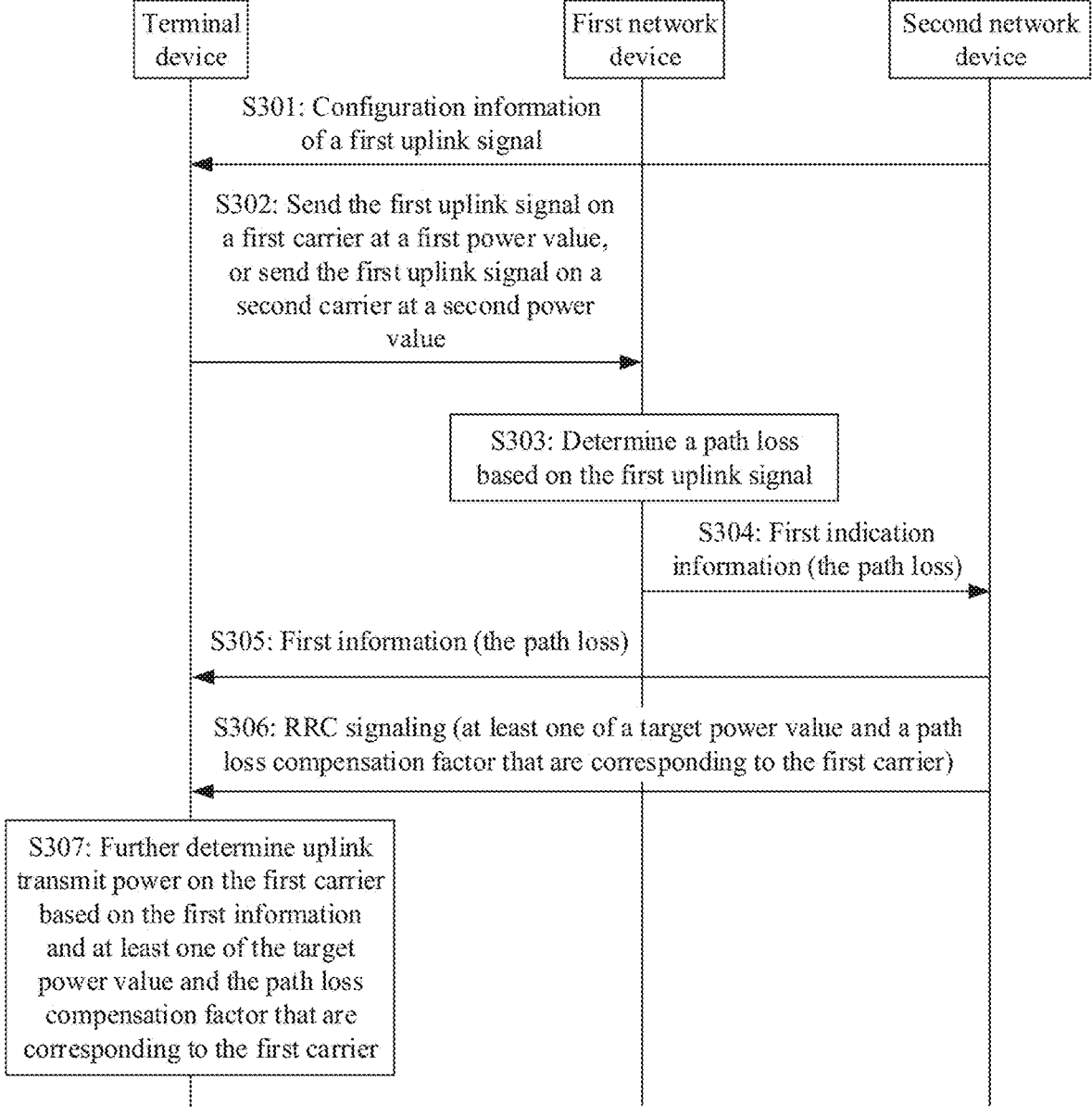
FIG. 6 is still another schematic flowchart of a method for determining transmit power according to an embodiment of this application.

FIG. 6 is still another schematic flowchart of a method for determining transmit power according to an embodiment of this application. In this embodiment, an example in which first information includes a path loss is used. The path loss in this embodiment may also be replaced with any one or more of the range of the path loss, the signal strength, the range of the signal strength, the channel quality state, and the range of the channel quality state described in Embodiment 1.

For example, the method may include the following.

S301: A second network device sends configuration information of a first uplink signal to a terminal device. Correspondingly, the terminal device receives the configuration information of the first uplink signal.

The configuration information includes a dedicated sequence and/or resource of the first uplink signal. For example, the configuration information includes a time-frequency resource of a signal sequence, an identifier of the signal sequence, and fourth indication information. The fourth indication information indicates that the signal sequence is used for uplink measurement. In this way, when configuring the terminal device to send the first uplink signal, the second network device/a first network device indicates, using the fourth indication information, that the first uplink signal is used for uplink measurement, such that the terminal device can perform identification, and can correspondingly send the first uplink signal when the terminal device is triggered to send the first uplink signal.

In an implementation, the configuration information is specific to a first carrier on a first spectrum. To be more specific, a sequence and/or a resource of the first uplink signal may be separately configured for each first carrier on the first spectrum. The configuration information includes a corresponding carrier identifier.

In another implementation, the configuration information is specific to a first carrier group on a first spectrum. To be more specific, a same sequence and/or resource of the first uplink signal are/is configured for a plurality of first carriers on the first spectrum. Optionally, the configuration information includes an identifier of a corresponding carrier group. A relationship between the carrier group and the first carrier may be configured using other signaling.

In still another implementation, the configuration information is specific to a first carrier on a first spectrum and the first network device. The implementation is applicable to a scenario in which a plurality of first network devices share one first carrier, and it is stipulated that the configuration information is specific to the first carrier on the first spectrum and the first network device. To be more specific, for different first network devices, corresponding sequences and/or resources are configured for first uplink signals sent on a same first carrier, to distinguish between the first carrier and the first network device.

In still another implementation, the configuration information is specific to a first carrier group on a first spectrum and the first network device. The implementation is applicable to a scenario in which a plurality of first network devices share a plurality of first carriers in one carrier group, and it is stipulated that the configuration information is specific to the carrier group on the first spectrum and the first network device. That is, for different first network devices, corresponding sequences and/or resources are configured for first uplink signals sent on a same carrier group, to distinguish between the carrier group and the first network device.

The first uplink signal may be configured by the second network device/the first network device. If the first uplink signal is configured by the second network device, and the first carrier between the first network device and the terminal device is configured as an all-uplink carrier, the second network device may send the configuration information of the first uplink signal to the terminal device. The second network device may send indication information including the configuration information to the first network device through an Xn interface of the first network device. In this way, the first network device is enabled to perform corresponding receiving. If the first uplink signal is configured by the second network device, and the first carrier includes a small quantity of downlink slots, the second network device may send indication information including the configuration information to the first network device through an Xn interface of the first network device, and then the first network device sends the configuration information to the terminal device. If the first uplink signal is configured by the first network device, and the first carrier is configured as an all-uplink carrier, the first network device sends indication information including the configuration information to the second network device, and then the second network device sends the configuration information to the terminal device. If the first uplink signal is configured by the first network device, and the first carrier includes a small quantity of downlink slots, the first network device may send the configuration information to the terminal device.

In this embodiment of this application, when the second network device configures a resource of the first uplink signal for the first network device/the terminal device, the fourth indication information may indicate that the resource is used for uplink measurement. Therefore, the first network device/the terminal device can perform identification. Optionally, when the terminal device periodically sends or is triggered to send the first uplink signal, the first network device can correspondingly trigger the terminal device to send the first uplink signal. Certainly, a resource of the first uplink signal may be determined by the second network device, or may be determined by the first network device and exchanged with the second network device.

In an implementation, when the second network device configures an identifier of a resource of the first uplink signal for the first network device/the terminal device, the identifier indicates that the resource is used for uplink measurement. In another implementation, when configuring a resource of the first uplink signal for the first network device/the terminal device, the second network device adds one piece of indication information, to identify that the resource of the first uplink signal is used for uplink measurement. Alternatively, the second network device adds one piece of indication information, to identify whether the resource of the first uplink signal is used for uplink measurement. Optionally, the indication information is one bit.

In this embodiment of this application, the resource of the first uplink signal may be separately configured for different carrier identifiers related to the second frequency band, or the resource of the first uplink signal may indicate TDD transmission patterns (pattern) on different carriers for a same configuration. A symbol location of the first uplink signal may be consecutive symbols or non-consecutive symbols in one slot. The first uplink signal may occupy a location of any orthogonal frequency division multiplexing (OFDM) symbol in one slot.

Optionally, when the second network device configures the resource of the first uplink signal for the first network device/the terminal device, an identifier of the resource or one piece of indication information indicates that the resource is used for both obtaining a TA and uplink measurement. Therefore, the first network device/the terminal device can perform identification. Optionally, when the terminal device periodically sends or is triggered to send the first uplink signal, the first network device can correspondingly trigger the terminal device to send the first uplink signal. Certainly, the resource of the first uplink signal may also be determined by the first network device and exchanged with the second network device.

In an embodiment, when the second network device configures an identifier of the resource of the first uplink signal for the first network device/the terminal device, the identifier indicates that the resource is used for both obtaining the TA and uplink measurement. In another embodiment, when configuring a resource of the first uplink signal for the first network device/the terminal device, the second network device adds one piece of indication information, to identify that the resource of the first uplink signal is used for both obtaining the TA and uplink measurement. Alternatively, the second network device adds one piece of indication information, to identify whether the resource of the first uplink signal is used to obtain the TA and used for uplink measurement. Optionally, the indication information is one bit.

In this embodiment of this application, the resource of the first uplink signal may be separately configured for different carrier identifiers related to the second frequency band, or may indicate TDD transmission patterns on different carriers for a same configuration. A symbol location of the first uplink signal may be consecutive symbols or non-consecutive symbols in one slot. The first uplink signal may occupy a location of an OFDM symbol in one slot.

S302: The terminal device sends, on the first carrier, the first uplink signal to the first network device at a first power value, or sends the first uplink signal to the first network device on a second carrier at a second power value. Correspondingly, the first network device receives the first uplink signal on the first carrier or the second carrier.

It is assumed that the configuration information of the first uplink signal is specific to the first carrier on the first spectrum, the terminal device sends the first uplink signal to the first network device on the first carrier at the first power value, or sends the first uplink signal to the first network device on the second carrier at the second power value. The second carrier and the first carrier belong to one carrier group. In addition, at least one of the first carrier or the second carrier is on the first spectrum.

The terminal device sends the first uplink signal to the first network device on the first carrier at the first power value, or sends the first uplink signal to the first network device on the second carrier at the second power value. The first power value/the second power value may be initial uplink power.

In this embodiment, to enable the first network device to obtain the first path loss, the first network device needs to learn of the initial power value. The initial power value may be learned of in the following several manners.

In an implementation, the initial power value may be a predefined value, a preconfigured value, or a default value. The preconfigured value may be a value indicated by the first network device/the second network device using RRC signaling or the like.

In another implementation, the first power value is included in the first uplink signal. For example, an index value corresponding to the first power value may be included in the first uplink signal, or the first uplink signal includes an indication bit of the first power value, and the indication bit of the first power value indicates the first power value. For example, it is assumed that a sequence of the first uplink signal occupies X bits, and Y bits may be added. Index values corresponding to the Y bits represent different first power values, or $2^Y$ indication bits or states corresponding to the Y bits may represent different first power values. A correspondence between the index value and the first power value may be preconfigured.

In still another implementation, there is an association relationship between a transmission configuration or transmission configuration information of the first uplink signal and the first power value. In other words, resource information/sequence information that is of the first uplink signal and that is sent by the terminal device to the first network device corresponds to the first power value. For example, the transmission configuration of the first uplink signal may be set to a plurality of sets (set), and each set includes at least one of a resource set or a sequence set. In addition, each set corresponds to one first power value. In this case, the sent first uplink signal represents a corresponding first power value.

S303: The first network device determines a path loss based on the first uplink signal.

Because the second carrier and the first carrier belong to one carrier group and have similar carrier attributes, a path loss obtained by the first network device based on sending the first uplink signal on the first carrier is similar to a path loss obtained by the first network device based on sending the first uplink signal on the second carrier. Therefore, the first network device may determine the path loss based on the first uplink signal. For example, the first network device may obtain, according to step S302, the first power value for sending the first uplink signal by the terminal device, and the first network device may determine, based on the first uplink signal, signal strength of the first uplink signal. Therefore, the first network device may determine that the path loss is a difference between the first power value for sending the first uplink signal and the signal strength.

In another embodiment, the first network device may not learn of the first power value used by the terminal device to send the first uplink signal. Therefore, after determining the signal strength of the first uplink signal based on the first uplink signal, the first network device notifies the terminal device of the signal strength, and the terminal device calculates the path loss.

In another embodiment, the first network device determines, based on the first uplink signal, a channel quality state corresponding to the first carrier, and then the first network device notifies the terminal device of the channel quality state.

S304: The first network device sends first indication information to the second network device. Correspondingly, the second network device receives the first indication information. The first indication information includes the path loss.

For implementation of this step, refer to step S103 in the embodiment shown in FIG. 4.

S305: The second network device sends first information to the terminal device. Correspondingly, the terminal device receives the first information. The first information includes the path loss.

For implementation of this step, refer to step S104 in the embodiment shown in FIG. 4.

Optionally, this embodiment may include steps 306 and 307. When both of step 305 and step 306 exist, a sequence of step 305 and step 306 is not limited. That is, S305 may be performed first, and then S306 is performed. Alternatively, S306 may be performed first, and then S305 is performed.

S306: The second network device sends RRC signaling to the terminal device, where the RRC signaling includes at least one of a target power value and a path loss compensation factor that are corresponding to the first carrier. Correspondingly, the terminal device receives the RRC signaling.

According to the foregoing formula 1, the uplink transmit power is further related to at least one of the target power value (target power) and the path loss compensation factor (alpha). In the conventional technology, a micro base station works in a low frequency band and has a large quantity of downlink slots, and the micro base station may configure the target power value, the path loss compensation factor, and the like for the micro base station. In this embodiment, the first network device works in a high frequency band, and the first carrier is an all-uplink carrier or an uplink-dominant carrier. Therefore, in this embodiment, when the first carrier is the all-uplink carrier, the second network device configures, for the terminal device, at least one of the target power value and the path loss compensation factor that are corresponding to the first carrier; and when the first carrier is the uplink-dominant carrier, the first network device/the second network device may configure, for the terminal device, at least one of the target power value and the path loss compensation factor that are corresponding to the first carrier. The target power value corresponding to the first carrier may be an absolute value of the target power value on the first carrier, or a relative value of the target power value on the first carrier relative to the target power value on a carrier on which the second network device is located. The path loss compensation factor corresponding to the first carrier may be an absolute value of the path loss compensation factor on the first carrier, or a relative value of the path loss compensation factor on the first carrier relative to the path loss compensation factor on the carrier on which the second network device is located. The carrier on which the second network device is located may also be understood as a carrier on a spectrum on which the second network device is located. The first carrier is a carrier on a spectrum on which the first network device is located. The first carrier in the first spectrum belongs to a carrier in the first carrier group. Optionally, the first carrier group has a common target power value, a common path loss compensation factor, and common first information.

For example, the first network device or the second network device provides a specific target power value and a specific path loss compensation factor on a 4.9 GHz frequency band. The specific target power value and the path loss compensation factor on the 4.9 GHz band may be absolute values, or relative values to the target power value and the path loss compensation factor on a low frequency at which the terminal device currently operates. In other words, the specific target power value and the path loss compensation factor on the 4.9 GHz band may be an offset of the target power value of the path loss compensation factor, and an offset of the path loss compensation factor relative to the target power value on the low frequency at which the terminal device currently operates.

S307: The terminal device further determines uplink transmit power on the first carrier based on the first information and at least one of the target power value and the path loss compensation factor that are corresponding to the first carrier.

For open-loop power control, the terminal device may further determine the uplink transmit power on the first carrier based on the first information and at least one of the target power value and the path loss compensation factor that are corresponding to the first carrier, to accurately determine the uplink transmit power.

According to the method for determining transmit power provided in this embodiment of this application, the terminal device sends the uplink signal, such that the first network device determines the first information based on the uplink signal, and the terminal device accurately determines the uplink transmit power on the first carrier based on the first information and at least one of the target power value and the path loss compensation factor that are corresponding to the first carrier. In this way, the uplink transmit power on the first carrier is accurately controlled, communication reliability is improved, and power consumption of the terminal device is reduced.

In this embodiment of this application, an SRS used to perform uplink measurement to determine an uplink active carrier/adjust an uplink active carrier and an SRS used to obtain a channel state may be different signals. When the two SRSs are different signals, if the signals are periodic, periods of the two signals may be configured to be the same, or a period of one signal may be configured to be a multiple of a period of the other signal. For example, a perimeter used for uplink measurement is configured as a multiple of a period value of an SRS used to obtain a channel state.

If the SRSs are aperiodic, a triggered SRS may be or may be used to determine an uplink active carrier/adjust an uplink active carrier, an SRS used to obtain a channel state, or an SRS not only used to determine an uplink active carrier/adjust an uplink active carrier, but also used to obtain a channel state.

Optionally, corresponding trigger configurations may be provided corresponding to the foregoing different situations. Optionally, corresponding closed-loop power control configurations may be provided corresponding to the foregoing different situations.

Figures 7, 8:
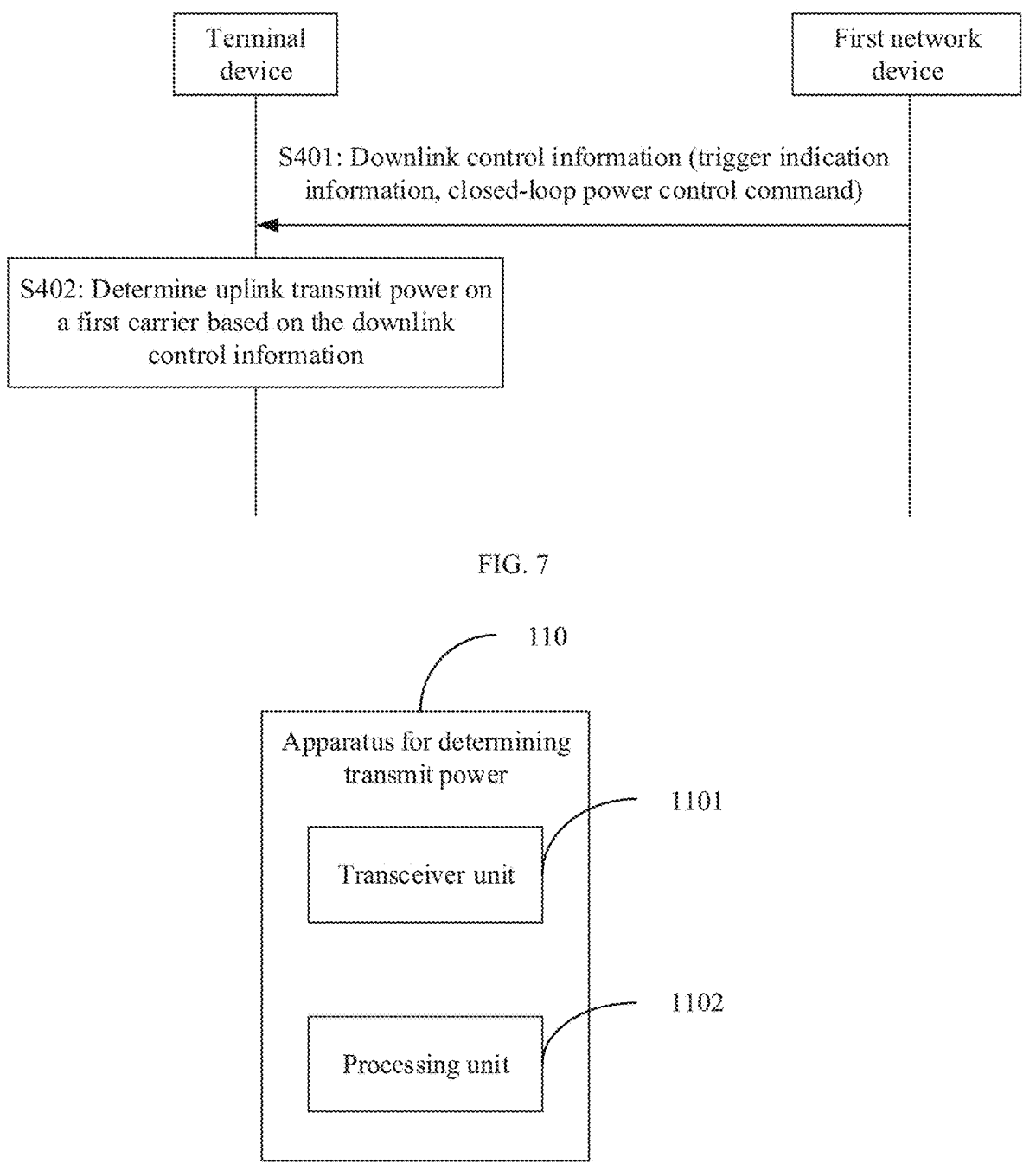
FIG. 7 is still another schematic flowchart of a method for determining transmit power according to an embodiment of this application.
FIG. 8 is a schematic diagram of a structure of an apparatus 110 for determining transmit power according to an embodiment of this application.

FIG. 7 is still another schematic flowchart of a method for determining transmit power according to an embodiment of this application. The method may be applicable to a closed-loop power control scenario. For example, the method may include the following.

S401: A first network device sends downlink control information to a terminal device.

Correspondingly, the terminal device detects the downlink control information.

The downlink control information includes at least one information block, and the at least one information block includes at least one piece of the following information: trigger indication information (trigger bit) and a closed-loop power control command (TPC command). The trigger indication information is used to trigger transmission of a first uplink signal. For example, that the at least one information block includes the at least one piece of information may be that each information block includes the at least one piece of information, or may be that some information blocks include the at least one piece of information.

In this embodiment of this application, the information block may be understood as at least one field. When the information block is one field, the information block is equivalent to the field. When the information block is a plurality of fields, the information block includes the foregoing plurality of fields.

The at least one information block corresponds to at least one first carrier. Optionally, one information block corresponds to one first carrier, that is, the at least one piece of information in the information block corresponds to one first carrier. To be more specific, the trigger indication information in the information block is used to trigger transmission of the first uplink signal on the first carrier, and the closed-loop power control command is used to perform power control on uplink transmission on the first carrier. Optionally, one information block corresponds to one first carrier group, that is, the at least one piece of information in the information block corresponds to one first carrier group. To be more specific, the trigger indication information in the information block is used to trigger transmission of the first uplink signal on the carrier to which the first carrier group belongs, and the closed-loop power control command is used to perform power control on uplink transmission on a carrier to which the first carrier group belongs.

A correspondence between the at least one information block and a carrier or a carrier group is configured using RRC signaling. Optionally, a second network device configures the correspondence between the at least one information block and the carrier or the carrier group using the RRC signaling. A carrier included in each carrier group is also configured using the RRC signaling. The correspondence between the at least one information block and the carrier or the carrier group is a correspondence between the at least one information block and the carrier or the carrier group of the first network device. Optionally, the first network device determines the correspondence between the at least one information block and the carrier or the carrier group, and sends the correspondence to the second network device. Optionally, the first network device determines a carrier included in each carrier group, and sends the carrier to the second network device.

In addition, for a closed-loop link between the second network device and the terminal device, a closed-loop power control adjustment state (PC adjustment state or PC state for short) configured by the second network device for uplink data transmission or uplink signal transmission to which the second network device belongs currently exists. However, this embodiment relates to a closed-loop link between the first network device and the terminal device. Therefore, optionally, before step S401, the method may further include the following step: The second network device sends second information to the first network device. The second information includes a closed-loop power control adjustment state set for uplink data transmission or uplink signal transmission to which the first network device belongs. Optionally, the closed-loop power control adjustment state set for uplink data transmission or uplink signal transmission of the first network device may be configured by the second network device. Further, the downlink control information further includes indication information of the closed-loop power control adjustment state, that is, the terminal device is notified, using the downlink control information, of the closed-loop power control adjustment state of the uplink data transmission or the uplink signal transmission of the first network device. For example, the closed-loop power control adjustment state that is configured by the second network device for uplink data transmission or uplink signal transmission of the second network device currently includes X states. In this case, a $(X+1)^{th}$ state may be set to the closed-loop power control adjustment state for the uplink data transmission or the uplink signal transmission of the first network device. X is a positive integer, for example, X=2. In this case, a third state is the closed-loop power control adjustment state of the uplink data transmission or the uplink signal transmission to which the first network device belongs. When the closed-loop power control adjustment state is optional $\{1, 2, 3\}$, and when the closed-loop power control adjustment state indicated in the DCI is 3, it indicates that current closed-loop power control signaling is used for the uplink data transmission or the uplink signal transmission of the first network device. When the closed-loop power control adjustment state is optional $\{0, 1, 2\}$, and when the closed-loop power control adjustment state indicated in the DCI is 2, it indicates that current closed-loop power control signaling is used for the uplink data transmission or the uplink signal transmission of the first network device.

For each closed-loop power control adjustment state, at least one closed-loop power control adjustment step (step-size) may be preconfigured. In addition, the closed-loop power control command corresponds to a corresponding configured closed-loop power control adjustment step of the closed-loop power control adjustment state. For example, for the closed-loop power control adjustment state of the uplink data transmission or the uplink signal transmission to which the first network device belongs, four closed-loop power control adjustment steps are preconfigured, and the closed-loop power control command includes two bits, a correspondence between a state value of the closed-loop power control command and the closed-loop power control adjustment step of the closed-loop power control adjustment state is shown in the following Table 1:

TABLE 1

| State value of a closed-loop power control command | Closed-loop power control adjustment step |
|---|---|
| 00 | Step 1 |
| 01 | Step 2 |
| 10 | Step 3 |
| 11 | Step 4 |

If the closed-loop power control command in the downlink control information is "00", the terminal device may determine that a closed-loop power adjustment step of the closed-loop power control adjustment state is step 1. If the closed-loop power control command in the downlink control information is "01", in this case, the terminal device may determine that a closed-loop power adjustment step of the closed-loop power control adjustment state is step 2, and the rest can be deduced by analogy.

In an implementation, if the downlink control information is newly defined, the trigger indication information is first trigger indication information, and the first trigger indication information is used by the second network device to trigger uplink signal transmission of the first network device. To be more specific, the first trigger indication information is specially used by the second network device to trigger the uplink signal transmission of the first network device.

In this embodiment of this application, the uplink signal or the uplink signal transmission of the first network device includes an uplink signal sent to the first network device or an uplink signal that needs to be detected by the first network device.

Optionally, the trigger indication information included in the downlink control information includes only first trigger indication information. To be more specific, the downlink control information does not include other trigger indication information, for example, does not include trigger indication information used by the second network device to trigger uplink signal transmission of the second network device.

Optionally, the closed-loop power control command included in the downlink control information includes only a closed-loop power control command corresponding to the first trigger indication information.

Optionally, the downlink control information is scrambled using a first radio network temporary identifier (RNTI). The first RNTI is newly introduced in this embodiment. For example, the first uplink signal is an access-SRS, and the first RNTI may be referred to as access-SRS-TPC-RNTI or any other name. The first RNTI indicates that the first uplink signal is used for uplink measurement of different network devices. Optionally, the first RNTI indicates that the first uplink signal is used by the first network device to perform uplink measurement or used by the second network device to perform uplink measurement.

In another implementation, the downlink control information is a new field added to the existing downlink control information, and a new format is introduced. In an example, the trigger indication information includes first trigger indication information and second trigger indication information; the first trigger indication information is used by the second network device to trigger uplink signal transmission of the first network device; and the second trigger indication information is used by the second network device to trigger uplink signal transmission of the second network device. The uplink signal or the uplink signal transmission of the first network device includes: an uplink signal sent to the first network device, or an uplink signal that needs to be detected by the first network device. Similarly, the uplink signal or the uplink signal transmission of the second network device includes: an uplink signal sent to the second network device, or an uplink signal that needs to be detected by the second network device.

Optionally, the closed-loop power control command included in the downlink control information includes a closed-loop power control command corresponding to the first trigger indication information and a closed-loop power control command corresponding to the second trigger indication information.

Further, the downlink control information further includes second indication information, and the second indication information indicates that the first uplink signal is used by the first network device to perform uplink measurement.

Optionally, the second indication information indicates to trigger transmission of the first uplink signal once or trigger semi-persistent transmission of the first uplink signal. The semi-persistent transmission of the first uplink signal may also be referred to as semi-persistently scheduled transmission of the first uplink signal. Duration or times of the semi-persistent transmission is configurable. In this embodiment of this application, any "configurable" means that the first network device/the second network device configures using signaling. For example, the first network device/the second network device configures using at least one of RRC, MAC, or physical layer signaling.

Optionally, the downlink control information is scrambled using a second RNTI. The second RNTI may be similar to the first RNTI, and is newly introduced in this embodiment. Alternatively, the second RNTI may reuse an existing RNTI. For example, the second RNTI may reuse an existing SRS-TPC-RNTI.

Formats of different downlink control information in the foregoing two implementations may be configured using RRC signaling. The RRC signaling is sent by the second network device.

The terminal device receives the downlink control information from the second network device.

Optionally, the downlink control information may further include third indication information, the third indication information indicates to trigger transmission of the first uplink signal once or trigger semi-persistent transmission of the first uplink signal; and the first uplink signal is used by the first network device to perform uplink measurement. The second indication information and the third indication information are different information.

S402: The terminal device determines uplink transmit power on the first carrier based on the downlink control information.

The terminal device receives the downlink control information, and obtains at least one of the trigger indication information, the closed-loop power control adjustment state, and the closed-loop power control command in the information block based on a carrier identifier of the first carrier in the information block. The trigger indication information is used to trigger transmission of the first uplink signal on the first carrier, and the closed-loop power control adjustment state is a closed-loop power control adjustment state set for uplink data transmission or uplink signal transmission of the first network device; and the closed-loop power control adjustment step of the closed-loop power control adjustment state is determined based on a correspondence between the closed-loop power control command and the closed-loop power control adjustment step of the closed-loop power control adjustment state. The terminal device determines the uplink transmit power on the first carrier based on the closed-loop power control adjustment step of the closed-loop power control adjustment state. Optionally, the terminal device may send the first uplink signal on the first carrier using the uplink transmit power, for uplink measurement.

According to the method for determining transmit power provided in this embodiment of this application, the terminal device receives the downlink control information sent by the first network device, and can accurately determine the uplink transmit power on the first carrier based on at least one of the trigger indication information and the closed-loop power control command that are included in the downlink control information. Therefore, communication reliability is improved, and power consumption of the terminal device is reduced.

It may be understood that, in the foregoing embodiments, the methods and/or steps implemented by the terminal device may also be implemented by a component (for example, a chip or a circuit) that can be used in the terminal device. The method and/or the steps implemented by the first network device may also be implemented by a component (for example, a chip or a circuit) that can be used in the first network device. The method and/or the steps implemented by the second network device may also be implemented by a component (for example, a chip or a circuit) that can be used in the second network device.

The foregoing mainly describes the solutions provided in embodiments of this application from a perspective of interaction between network elements. Correspondingly, an embodiment of this application further provides an apparatus for determining transmit power. The apparatus for determining transmit power is configured to implement the foregoing methods. The apparatus for determining transmit power may be the terminal device in the foregoing method embodiments, an apparatus including the foregoing terminal device, or a component that can be used in the terminal device. Alternatively, the apparatus for determining transmit power may be the first network device in the foregoing method embodiments, an apparatus including the foregoing first network device, or a component that can be used in the first network device. It may be understood that, to implement the foregoing functions, the apparatus for determining transmit power includes corresponding hardware structures and/or software modules for performing the functions. A person skilled in the art should easily be aware that, in combination with units and algorithm steps of the examples described in embodiments disclosed in this specification, this application may be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

In embodiments of this application, the apparatus for determining transmit power may be divided into functional modules based on the foregoing method embodiments. For example, each functional module may be obtained through division based on each corresponding function, or two or more functions may be integrated into one processing module. The integrated module may be implemented in a form of hardware, or may be implemented in a form of a software functional module. It should be noted that, in embodiments of this application, module division is an example, and is merely a logical function division. In an actual implementation, another division manner may be used.

FIG. 8 is a schematic diagram of a structure of an apparatus 110 for determining transmit power. The apparatus 110 for determining transmit power includes a transceiver unit 1101 and a processing unit 1102. The transceiver unit 1101 may also be referred to as a transceiver unit, configured to implement a transceiver function, for example, may be a transceiver circuit, a transceiver machine, a transceiver, or a communication interface.

For example, the apparatus 110 for determining transmit power is the terminal device in the method embodiments shown in FIG. 4 to FIG. 6.

The transceiver unit 1101 is configured to receive first information, where the first information indicates at least one of a path loss, a range of the path loss, signal strength, a range of the signal strength, a channel quality state, and a range of the channel quality state. The processing unit 1102 is configured to determine uplink transmit power on a first carrier based on the first information.

Optionally, the transceiver unit 1101 is further configured to send a first uplink signal to a first network device on the first carrier; or the transceiver unit 1101 is further configured to send the first uplink signal to the first network device on a second carrier, and the second carrier and the first carrier belong to one carrier group.

Optionally, the transceiver unit 1101 is further configured to send, on the first carrier, the first uplink signal to the first network device at a first power value, where the first power value is included in the first uplink signal, the first power value is preconfigured, or there is an association relationship between a transmission configuration of the first uplink signal and the first power value.

Optionally, the transceiver unit 1101 is further configured to receive the first information from a second network device; or the transceiver unit 1101 is further configured to receive the first information from the first network device within a first slot, where the first slot is a downlink slot configured by the first network device for a terminal device.

Optionally, the processing unit 1102 is further configured to obtain at least one of a target power value and a path loss compensation factor that are corresponding to the first carrier, where the target power value and the path loss compensation factor that are corresponding to the first carrier are configured by the first network device or the second network device for a terminal device using radio resource control signaling. The processing unit 1102 is further configured to determine the uplink transmit power based on at least one of the first information, where the target power value and the path loss compensation factor that are corresponding to the first carrier.

Optionally, the processing unit 1102 is further configured to obtain configuration information of the first uplink signal, where the configuration information is specific to the first carrier on a first spectrum, the configuration information is specific to the first carrier group on a first spectrum, the configuration information is specific to the first carrier on a first spectrum and the first network device, or the configuration information is specific to the first carrier group on a first spectrum and the first network device.

For example, the apparatus 110 for determining transmit power is the first network device in the method embodiments shown in FIG. 4 to FIG. 6.

The transceiver unit 1101 is configured to obtain first information, where the first information includes at least one of a path loss, a range of the path loss, signal strength, a range of the signal strength, a channel quality state, and a range of the channel quality state. The transceiver unit 1101 is further configured to send the first information.

Optionally, the transceiver unit 1101 is further configured to receive a first uplink signal from a terminal device on a first carrier; or the transceiver unit 1101 is further configured to receive the first uplink signal from a terminal device on a second carrier, and the second carrier and the first carrier belong to one carrier group. The processing unit 1102 is configured to determine the first information based on the first uplink signal.

Optionally, the transceiver unit 1101 is further configured to receive, on the first carrier, the first uplink signal sent by the terminal device at a first power value, and the first power value is included in the first uplink signal, the first power value is preconfigured, or there is an association relationship between a transmission configuration of the first uplink signal and the first power value.

Optionally, the transceiver unit 1101 is further configured to send first indication information to a second network device, where the first indication information includes at least one of the path loss, the range of the path loss, signal strength, the range of the signal strength, the channel quality state, and the range of the channel quality state; or the transceiver unit 1101 is further configured to send the first information to the terminal device within a first slot, where the first slot is a downlink slot configured by the first network device for the terminal device.

Optionally, the transceiver unit 1101 is further configured to send radio resource control signaling to the terminal device, where the radio resource control signaling includes at least one of the target power value and the path loss compensation factor that are corresponding to the first carrier.

Optionally, the transceiver unit 1101 is further configured to send configuration information of the first uplink signal, where the configuration information is specific to the first carrier on a first spectrum, the configuration information is specific to a first carrier group on a first spectrum, the configuration information is specific to the first carrier on a first spectrum and the first network device, or the configuration information is specific to a first carrier group on a first spectrum and the first network device.

For example, the apparatus 110 for determining transmit power is the terminal device in the method embodiments shown in FIG. 7.

The transceiver unit 1101 is configured to receive downlink control information, where the downlink control information includes at least one information block, the at least one information block includes at least one piece of the following information: trigger indication information and a closed-loop power control command, and the trigger indication information is used to trigger transmission of a first uplink signal; and processing unit 1102 is configured to determine uplink transmit power on a first carrier based on the downlink control information.

Optionally, the transceiver unit 1101 is further configured to obtain a closed-loop power control adjustment state, where the closed-loop power control adjustment state is configured by the second network device for uplink data transmission or uplink signal transmission of the first network device.

For example, the apparatus 110 for determining transmit power is the second network device in the method embodiments shown in FIG. 7.

The transceiver unit 1101 is configured to send downlink control information, where the downlink control information includes at least one information block, the at least one information block includes at least one piece of the following information: trigger indication information and a closed-loop power control command, and the trigger indication information is used to trigger transmission of a first uplink signal.

Optionally, the downlink control information includes a closed-loop power control adjustment state, and the transceiver unit 1101 is further configured to send first information to a first network device, where the first information includes the closed-loop power control adjustment state configured by the second network device for uplink data transmission or uplink signal transmission of the first network device.

All related content of the steps in the foregoing method embodiments may be cited in function descriptions of corresponding functional units. Details are not described herein again.

In this embodiment, the apparatus 110 for determining transmit power is presented in a form of functional units obtained through division in an integrated manner. The "unit" herein may be an application-specific integrated circuit (ASIC), a circuit, a processor and a memory that execute at least one software or firmware program, an integrated logic circuit, and/or another component that can provide the foregoing functions.

For example, the processor 301 in the apparatus 300 for determining transmit power shown in FIG. 3 may invoke the computer-executable instructions stored in the memory 303, to enable the apparatus 300 for determining transmit power to perform the method for determining transmit power in the foregoing method embodiments.

For example, functions/implementation processes of the transceiver unit 1101 and the processing unit 1102 in FIG. 8 may be implemented by the processor 301 in the apparatus 300 for determining transmit power shown in FIG. 3 by invoking the computer-executable instructions stored in the memory 303. Alternatively, a function/implementation process of the processing unit 1102 in FIG. 8 may be implemented by the processor 301 in the apparatus 300 for determining transmit power shown in FIG. 3 by invoking the computer-executable instructions stored in the memory 303. A function/implementation process of the transceiver unit 1101 in FIG. 8 may be implemented using the communication interface 304 in the apparatus 300 for determining transmit power shown in FIG. 3.

Because the apparatus 110 for determining transmit power provided in this embodiment may perform the method for determining transmit power in the foregoing method embodiments, for technical effects that can be achieved by the apparatus 110, refer to the foregoing method embodiments. Details are not described herein again.

It should be noted that at least one of the foregoing units or units may be implemented by software, hardware, or a combination thereof. When any one of the units or the units is implemented using the software, the software exists in a form of computer program instructions, and is stored in the memory. The processor may be configured to execute the program instructions and implement the foregoing method procedures. The processor may be built in a system on chip (SoC) or an ASIC, or may be an independent semiconductor chip. In addition to a core for executing software instructions to perform operations or processing, the processor may further include a necessary hardware accelerator, for example, a field-programmable gate array (FPGA), a programmable logic device (PLD), or a logic circuit that implements a dedicated logic operation.

When the foregoing units are implemented using the hardware, the hardware may be any one or any combination of a central processing unit (CPU), a microprocessor, a digital signal processor (DSP) chip, a microcontroller unit (MCU), an artificial intelligence processor, an ASIC, a SoC, an FPGA, a PLD, a dedicated digital circuit, a hardware accelerator, or a non-integrated discrete device, and the hardware may run necessary software or does not depend on software to perform the foregoing method procedures.

Optionally, an embodiment of this application further provides a chip system, including at least one processor and an interface. The at least one processor is coupled to a memory through the interface. When the at least one processor executes a computer program or instructions in the memory, the method according to any one of the foregoing method embodiments is performed. Optionally, the chip system may include a chip, or may include a chip and another discrete component. This is not specifically limited in this embodiment of this application.

It should be understood that unless otherwise specified, "/" in descriptions of this application indicates an "or" relationship between associated objects. For example, A/B may indicate A or B. A and B may be singular or plural. In addition, in descriptions of this application, unless otherwise specified, "a plurality of" means two or more than two. "At least one of the following items (pieces)" or a similar expression thereof indicates any combination of these items, including a single item (piece) or any combination of a plurality of items (pieces). For example, at least one item (piece) of a, b, or c may indicate: a, b, c, a and b, a and c, b and c, or a, b, and c, where a, b, and c may be singular or plural. In addition, to clearly describe the technical solutions in embodiments of this application, terms such as "first" and "second" are used in embodiments of this application to distinguish between same items or similar items that provide basically same functions or purposes. A person skilled in the art may understand that the terms such as "first" and "second" do not limit a quantity or an execution sequence, and the terms such as "first" and "second" do not indicate a definite difference. In addition, in embodiments of this application, the word such as "example" or "for example" is used to represent giving an example, an illustration, or a description. Any embodiment or design described as an "example" or "for example" in embodiments of this application should not be explained as being more preferred or having more advantages than another embodiment or design scheme. Exactly, use of the word such as "example" or "for example" is intended to present a relative concept in a specific manner for ease of understanding.

All or some of the foregoing embodiments may be implemented using software, hardware, firmware, or any combination thereof. When a software program is used to implement embodiments, embodiments may be implemented completely or partially in a form of a computer program product. The computer program product includes at least one computer instruction. When the computer program instructions are loaded and executed on the computer, the procedure or functions according to embodiments of this application are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a web site, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating at least one usable medium. The usable medium may be a magnetic medium (for example, a floppy disk, a hard disk, or a magnetic tape), an optical medium (for example, a DVD), a semiconductor medium (for example, a solid-state disk (SSD)), or the like.

Although this application is described with reference to embodiments, in a process of implementing this application that claims protection, a person skilled in the art may understand and implement another variation of the disclosed embodiments by viewing the accompanying drawings, disclosed content, and appended claims. In the claims, "comprising" (comprising) does not exclude another component or another step, and "a" or "one" does not exclude a case of multiple. A single processor or another unit may implement several functions enumerated in the claims. Some measures are recorded in dependent claims that are different from each other, but this does not mean that these measures cannot be combined to produce a better effect.

Although this application is described with reference to example features and embodiments thereof, it is clear that various modifications and combinations may be made to them without departing from the spirit and scope of this application. Correspondingly, the specification and accompanying drawings are merely example description of this application defined by the accompanying claims, and are considered as any of or all modifications, variations, combinations or equivalents that cover the scope of this application. It is clearly that a person skilled in the art can make various modifications and variations to this application without departing from the spirit and scope of this application. This application is intended to cover these modifications and variations of this application provided that they fall within the scope of protection defined by the following claims and their equivalent technologies.

What is claimed is:

1. A method for determining transmit power, the method comprising:

sending a first uplink signal to a first network device on a first carrier, wherein the first carrier is an all-uplink carrier;

receiving first information from a second network device, wherein the first information indicates at least one of a path loss, a range of the path loss, a signal strength, a range of the signal strength, a channel quality state, or a range of the channel quality state, wherein the path loss corresponds to the first carrier or a first carrier group, wherein the range of the path loss corresponds to the first carrier or the first carrier group, wherein the signal strength corresponds to the first carrier or the first carrier group, wherein the range of the signal strength corresponds to the first carrier or the first carrier group, wherein a signal quality state corresponds to the first carrier or the first carrier group, wherein the range of the signal quality state corresponds to the first carrier or the first carrier group, wherein the first carrier is an uplink carrier or a carrier whose uplink slot configuration dominates in a slot configuration, and wherein the first carrier is in the first carrier group; and determining uplink transmit power on the first carrier based on the first information.

2. The method according to claim 1, wherein sending the first uplink signal to the first network device on the first carrier comprises sending, on the first carrier, the first uplink signal to the first network device at a first power value, and wherein the first power value is:

comprised in the first uplink signal, preconfigured, or associated with a transmission configuration of the first uplink signal.

3. The method according to claim 1, wherein the first information is carried in a random access response message or system information.

4. The method according to claim 1, further comprising:

obtaining at least one of a target power value corresponding to the first carrier or a path loss compensation factor corresponding to the first carrier, wherein the target power value and the path loss compensation factor are configured by the first network device or the second network device for a terminal device using radio resource control signaling; and determining the uplink transmit power based on the first information and at least one of the target power value or the path loss compensation factor.

5. The method according to claim 1, wherein the first uplink signal is a sounding reference signal (SRS).

6. A method for determining transmit power, the method comprising:

receiving a first uplink signal from a terminal device on a first carrier, wherein the first carrier is an all-uplink carrier;

determining first information based on the first uplink signal, wherein the first information comprises at least one of a path loss, a range of the path loss, a signal strength, a range of the signal strength, a channel quality state, or a range of the channel quality state; and sending the first information to a second network device, wherein the first information comprises at least one of the path loss, the range of the path loss, the signal strength, the range of the signal strength, the channel quality state, or the range of the channel quality state, wherein the path loss corresponds to the first carrier or a first carrier group, wherein the range of the path loss corresponds to the first carrier or the first carrier group, wherein the signal strength corresponds to the first carrier or the first carrier group, wherein the range of the signal strength corresponds to the first carrier or the first carrier group, wherein a signal quality state corresponds to the first carrier or the first carrier group, wherein the range of the signal quality state corresponds to the first carrier or the first carrier group, wherein the first carrier is an uplink carrier or a carrier whose uplink slot configuration dominates in a slot configuration, and wherein the first carrier is in the first carrier group.

7. The method according to claim 6, wherein receiving the first uplink signal from the terminal device on the first carrier comprises receiving, on the first carrier, the first uplink signal from the terminal device at a first power value, wherein the first power value is:

comprised in the first uplink signal,
preconfigured, or
associated with a transmission configuration of the first uplink signal.

8. The method according to claim 6, wherein the first uplink signal is a sounding reference signal (SRS).

9. An apparatus for determining transmit power, the apparatus comprising:

a memory storage device configured to store instructions; and
one or more processors in communication with the memory storage device, wherein the instructions, when executed by the one or more processors, cause the apparatus to:
send a first uplink signal to a first network device on a first carrier, wherein the first carrier is an all-uplink carrier;
receive first information from a second network device, wherein the first information indicates at least one of a path loss, a range of the path loss, a signal strength, a range of the signal strength, a channel quality state, or a range of the channel quality state, wherein the path loss corresponds to the first carrier or a first carrier group, wherein the range of the path loss corresponds to the first carrier or the first carrier group, wherein the signal strength corresponds to the first carrier or the first carrier group, wherein the range of the signal strength corresponds to the first carrier or the first carrier group, wherein a signal quality state corresponds to the first carrier or the first carrier group, wherein the range of the signal quality state corresponds to the first carrier or the first carrier group, wherein the first carrier is an uplink carrier or a carrier whose uplink slot configuration dominates in a slot configuration, and wherein the first carrier is in the first carrier group; and
determine uplink transmit power on the first carrier based on the first information.

10. The apparatus according to claim 9, wherein the instructions, when executed by the one or more processors, further cause the apparatus to send, on the first carrier, the first uplink signal to the first network device at a first power value, wherein the first power value is:

comprised in the first uplink signal,
preconfigured, or
associated with a transmission configuration of the first uplink signal.

11. The apparatus according to claim 9, wherein the first information is carried in a random access response message or system information.

12. The apparatus according to claim 9, wherein the instructions, when executed by the one or more processors, further cause the apparatus to:

obtain at least one of a target power value corresponding to the first carrier or a path loss compensation factor corresponding to the first carrier, wherein the target power value and the path loss compensation factor are configured by the first network device or the second network device for a terminal device using radio resource control signaling; and further determine the uplink transmit power based on the first information and at least one of the target power value or the path loss compensation factor.

13. The apparatus according to claim 9, wherein the first uplink signal is a sounding reference signal (SRS).

14. An apparatus for determining transmit power, the apparatus comprising:

a memory storage device configured to store instructions; and
one or more processors in communication with the memory storage device, wherein the instructions, when executed by the one or more processors, cause the apparatus to:
receive a first uplink signal from a terminal device on a first carrier, wherein the first carrier is an all-uplink carrier;
determine first information based on the first uplink signal, wherein the first information comprises at least one of a path loss, a range of the path loss, a signal strength, a range of the signal strength, a channel quality state, or a range of the channel quality state; and
send the first information to a second network device, wherein the first information comprises at least one of the path loss, the range of the path loss, the signal strength, the range of the signal strength, the channel quality state, or the range of the channel quality state, wherein the path loss corresponds to the first carrier or a first carrier group, wherein the range of the path loss corresponds to the first carrier or the first carrier group, wherein the signal strength corresponds to the first carrier or the first carrier group, wherein the range of the signal strength corresponds to the first carrier or the first carrier group, wherein a signal quality state corresponds to the first carrier or the first carrier group, wherein the range of the signal quality state corresponds to the first carrier or the first carrier group, wherein the first carrier is an uplink carrier or a carrier whose uplink slot configuration dominates in a slot configuration, and wherein the first carrier is in the first carrier group.

15. The apparatus according to claim 14, wherein the instructions, when executed by the one or more processors, further cause the apparatus to receive, on the first carrier, the first uplink signal from the terminal device at a first power value, wherein the first power value is:

comprised in the first uplink signal,
preconfigured, or

47

48 associated with a transmission configuration of the first uplink signal.

16. The apparatus according to claim 14, wherein the instructions, when executed by the one or more processors, further cause the apparatus to send the first information to the terminal device within a first slot, wherein the first slot is a downlink slot configured by a first network device for the terminal device.

17. The apparatus according to claim 14, wherein the first uplink signal is a sounding reference signal (SRS).

* * * * *